(12) United States Patent
Georgiev et al.

(10) Patent No.: US 8,803,918 B2
(45) Date of Patent: Aug. 12, 2014

(54) METHODS AND APPARATUS FOR CALIBRATING FOCUSED PLENOPTIC CAMERA DATA

(75) Inventors: Todor G. Georgiev, Sunnyvale, CA (US); Georgi N. Chunev, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 375 days.

(21) Appl. No.: 12/957,322

(22) Filed: Nov. 30, 2010

(65) Prior Publication Data

US 2013/0127901 A1    May 23, 2013

Related U.S. Application Data

(60) Provisional application No. 61/377,848, filed on Aug. 27, 2010.

(51) Int. Cl.
*G09G 5/00* (2006.01)

(52) U.S. Cl.
USPC ........................................................ 345/643

(58) Field of Classification Search
CPC ........... G06T 5/50; G06T 2207/10052; G06K 2009/2045
USPC ................................. 345/629–641
See application file for complete search history.

(56) References Cited

U.S. PATENT DOCUMENTS

| 725,567 | A | 4/1903 | Ives |
| 2,039,648 | A | 5/1936 | Ives |
| 3,743,379 | A | 7/1973 | McMahon |
| 3,971,065 | A | 7/1976 | Bayer |
| 3,985,419 | A | 10/1976 | Matsumoto et al. |
| 4,175,844 | A | 11/1979 | Glaser-Inbari |
| 4,180,313 | A | 12/1979 | Inuiya |

(Continued)

FOREIGN PATENT DOCUMENTS

| CN | 101588437 | 11/2009 |
| CN | 101610353 | 12/2009 |

(Continued)

OTHER PUBLICATIONS

Bishop et al., Light Field Superresolution, IEEE International Conference on Computational Photography, Apr. 2009.*

(Continued)

*Primary Examiner* — Xiao Wu
*Assistant Examiner* — Charles Tseng
(74) *Attorney, Agent, or Firm* — Wolfe-SBMC

(57) ABSTRACT

Methods, apparatus, and computer-readable storage media for calibrating focused plenoptic camera data. A calibration technique that does not modify the image data may be applied to raw plenoptic images. Calibration parameters, including but not limited to tilt angle, corner crops, main lens distance from the microlens array, sensor distance from the microlens array, and microimage size, may be specified. Calibration may include scaling down the input texture coordinates for the plenoptic image so that the new coordinate range fits the size of the texture with crops taken into account. These coordinates may be further transformed by one or more of a matrix performing a scaling, to correct for lens distortion; a rotation, to correct for tilts; and a translation that finalizes the necessary corner crops. A transformation matrix is generated that can be applied to the raw image by radiance processing techniques such as super-resolution techniques.

20 Claims, 20 Drawing Sheets

(56) References Cited

U.S. PATENT DOCUMENTS

| | | |
|---|---|---|
| 4,193,093 A | 3/1980 | St. Clair |
| 4,230,942 A | 10/1980 | Stauffer |
| 4,580,219 A | 4/1986 | Pelc et al. |
| 4,732,453 A | 3/1988 | de Montebello et al. |
| 4,849,782 A | 7/1989 | Koyama et al. |
| 5,076,687 A | 12/1991 | Adelson |
| 5,125,750 A | 6/1992 | Corel et al. |
| 5,361,127 A | 11/1994 | Daily |
| 5,400,093 A | 3/1995 | Timmers |
| 5,579,445 A | 11/1996 | Loce et al. |
| 5,659,420 A | 8/1997 | Wakai et al. |
| 5,724,122 A | 3/1998 | Oskotsky |
| 5,729,011 A | 3/1998 | Sekiguchi |
| 5,946,077 A | 8/1999 | Nemirovskiy |
| 5,987,164 A | 11/1999 | Szeliski et al. |
| 6,009,188 A * | 12/1999 | Cohen et al. ............... 382/154 |
| 6,097,394 A | 8/2000 | Levoy et al. |
| 6,097,541 A | 8/2000 | Davies et al. |
| 6,137,535 A | 10/2000 | Meyers |
| 6,137,937 A | 10/2000 | Okano et al. |
| 6,268,846 B1 | 7/2001 | Georgiev |
| 6,301,416 B1 | 10/2001 | Okano et al. |
| 6,317,192 B1 | 11/2001 | Silverbrook et al. |
| 6,339,506 B1 | 1/2002 | Wakelin et al. |
| 6,341,183 B1 * | 1/2002 | Goldberg .................. 382/276 |
| 6,351,269 B1 | 2/2002 | Georgiev |
| 6,476,805 B1 | 11/2002 | Shum et al. |
| 6,570,613 B1 | 5/2003 | Howell |
| 6,738,533 B1 | 5/2004 | Shum et al. |
| 6,804,062 B2 | 10/2004 | Atwater et al. |
| 6,831,782 B2 | 12/2004 | Patton et al. |
| 6,838,650 B1 | 1/2005 | Toh |
| 6,842,297 B2 | 1/2005 | Dowski, Jr. |
| 6,961,075 B2 | 11/2005 | Mindler et al. |
| 7,019,671 B2 | 3/2006 | Kawai |
| 7,054,067 B2 | 5/2006 | Okano et al. |
| 7,085,062 B2 | 8/2006 | Hauschild |
| 7,113,231 B2 | 9/2006 | Conner et al. |
| 7,119,319 B2 | 10/2006 | Noto et al. |
| 7,164,446 B2 | 1/2007 | Konishi |
| 7,167,203 B1 | 1/2007 | Yukawa et al. |
| 7,367,537 B2 | 5/2008 | Ibe |
| 7,470,032 B2 | 12/2008 | Damera-Venkata et al. |
| 7,620,309 B2 | 11/2009 | Georgiev |
| 7,723,662 B2 | 5/2010 | Levoy et al. |
| 7,732,744 B2 | 6/2010 | Utagawa |
| 7,792,423 B2 | 9/2010 | Raskar et al. |
| 7,838,814 B2 * | 11/2010 | Minhas et al. ............... 250/216 |
| 7,872,796 B2 | 1/2011 | Georgiev |
| 7,880,794 B2 | 2/2011 | Yamagata et al. |
| 7,916,934 B2 | 3/2011 | Vetro et al. |
| 7,936,392 B2 | 5/2011 | Ng et al. |
| 7,949,252 B1 | 5/2011 | Georgiev |
| 7,956,924 B2 | 6/2011 | Georgiev |
| 7,962,033 B2 | 6/2011 | Georgiev et al. |
| 7,965,936 B2 | 6/2011 | Raskar et al. |
| 7,978,234 B2 | 7/2011 | Yano et al. |
| 8,019,215 B2 | 9/2011 | Georgiev et al. |
| 8,106,994 B2 | 1/2012 | Ichimura |
| 8,126,323 B2 | 2/2012 | Georgiev et al. |
| 8,155,456 B2 | 4/2012 | Babacan et al. |
| 8,160,439 B2 | 4/2012 | Georgiev et al. |
| 8,189,065 B2 | 5/2012 | Georgiev et al. |
| 8,189,089 B1 | 5/2012 | Georgiev |
| 8,228,417 B1 | 7/2012 | Georgiev et al. |
| 8,237,843 B2 | 8/2012 | Yamamoto et al. |
| 8,243,157 B2 | 8/2012 | Ng et al. |
| 8,289,440 B2 | 10/2012 | Knight et al. |
| 8,290,358 B1 | 10/2012 | Georgiev |
| 8,315,476 B1 | 11/2012 | Georgiev et al. |
| 8,330,848 B2 | 12/2012 | Yamamoto |
| 8,345,144 B1 | 1/2013 | Georgiev et al. |
| 8,379,105 B2 | 2/2013 | Georgiev et al. |
| 8,380,060 B2 | 2/2013 | Georgiev et al. |
| 8,390,728 B2 | 3/2013 | Lim et al. |
| 8,400,555 B1 | 3/2013 | Georgiev et al. |
| 8,401,316 B2 | 3/2013 | Babacan |
| 8,471,920 B2 | 6/2013 | Georgiev et al. |
| 8,502,911 B2 | 8/2013 | Yamamoto et al. |
| 8,559,756 B2 | 10/2013 | Georgiev et al. |
| 8,570,426 B2 | 10/2013 | Pitts et al. |
| 8,611,693 B2 | 12/2013 | Intwala et al. |
| 8,665,341 B2 | 3/2014 | Georgiev et al. |
| 8,724,000 B2 | 5/2014 | Georgiev et al. |
| 8,749,694 B2 | 6/2014 | Georgiev et al. |
| 2001/0012149 A1 | 8/2001 | Lin et al. |
| 2001/0050813 A1 | 12/2001 | Allio |
| 2002/0140835 A1 | 10/2002 | Silverstein |
| 2002/0159030 A1 | 10/2002 | Frey et al. |
| 2003/0108821 A1 | 6/2003 | Mei et al. |
| 2003/0117511 A1 | 6/2003 | Belz et al. |
| 2003/0156077 A1 | 8/2003 | Balogh |
| 2003/0231255 A1 | 12/2003 | Szajewski et al. |
| 2004/0114807 A1 | 6/2004 | Lelescu et al. |
| 2004/0218830 A1 | 11/2004 | Kang et al. |
| 2004/0223214 A1 | 11/2004 | Atkinson |
| 2005/0080602 A1 | 4/2005 | Snyder et al. |
| 2005/0088714 A1 | 4/2005 | Kremen |
| 2005/0099504 A1 | 5/2005 | Nayar et al. |
| 2005/0122418 A1 | 6/2005 | Okita et al. |
| 2005/0243178 A1 | 11/2005 | McConica |
| 2006/0061845 A1 | 3/2006 | Lin |
| 2006/0072029 A1 | 4/2006 | Miyatake et al. |
| 2006/0104542 A1 | 5/2006 | Blake et al. |
| 2006/0109282 A1 * | 5/2006 | Lin et al. .................. 345/620 |
| 2006/0177150 A1 | 8/2006 | Uyttendaele et al. |
| 2007/0091197 A1 | 4/2007 | Okayama et al. |
| 2007/0252074 A1 | 11/2007 | Ng et al. |
| 2007/0258096 A1 | 11/2007 | Cui et al. |
| 2007/0285526 A1 | 12/2007 | Mann et al. |
| 2008/0007839 A1 | 1/2008 | Deng et al. |
| 2008/0056549 A1 | 3/2008 | Hamill et al. |
| 2008/0095469 A1 * | 4/2008 | Kiser ..................... 382/289 |
| 2008/0107231 A1 | 5/2008 | Miyazaki et al. |
| 2008/0142685 A1 | 6/2008 | Gazeley |
| 2008/0152215 A1 | 6/2008 | Horie et al. |
| 2008/0165270 A1 | 7/2008 | Watanabe et al. |
| 2008/0166063 A1 | 7/2008 | Zeng |
| 2008/0187305 A1 | 8/2008 | Raskar |
| 2008/0193026 A1 | 8/2008 | Horie et al. |
| 2008/0218610 A1 | 9/2008 | Chapman et al. |
| 2008/0247623 A1 | 10/2008 | Delso et al. |
| 2009/0002504 A1 | 1/2009 | Yano et al. |
| 2009/0027542 A1 | 1/2009 | Yamamoto et al. |
| 2009/0041381 A1 | 2/2009 | Georgiev |
| 2009/0041448 A1 | 2/2009 | Georgiev |
| 2009/0086304 A1 | 4/2009 | Yurlov et al. |
| 2009/0122175 A1 | 5/2009 | Yamagata |
| 2009/0127440 A1 | 5/2009 | Nakai |
| 2009/0128658 A1 | 5/2009 | Hayasaka et al. |
| 2009/0128669 A1 | 5/2009 | Ng et al. |
| 2009/0140131 A1 | 6/2009 | Utagawa |
| 2009/0167922 A1 | 7/2009 | Perlman et al. |
| 2009/0179142 A1 | 7/2009 | Duparre et al. |
| 2009/0185801 A1 | 7/2009 | Georgiev et al. |
| 2009/0190022 A1 | 7/2009 | Ichimura |
| 2009/0268970 A1 | 10/2009 | Babacan et al. |
| 2009/0295829 A1 | 12/2009 | Georgiev et al. |
| 2009/0316014 A1 | 12/2009 | Lim et al. |
| 2010/0013979 A1 | 1/2010 | Golub et al. |
| 2010/0026852 A1 | 2/2010 | Ng et al. |
| 2010/0085468 A1 | 4/2010 | Park et al. |
| 2010/0091133 A1 | 4/2010 | Lim et al. |
| 2010/0097491 A1 | 4/2010 | Farina et al. |
| 2010/0128145 A1 | 5/2010 | Pitts et al. |
| 2010/0141802 A1 | 6/2010 | Knight et al. |
| 2010/0205388 A1 | 8/2010 | MacInnis |
| 2010/0265381 A1 | 10/2010 | Yamamoto et al. |
| 2010/0265386 A1 | 10/2010 | Raskar et al. |
| 2011/0043604 A1 | 2/2011 | Peleg et al. |
| 2011/0063354 A1 | 3/2011 | Enge |
| 2011/0069189 A1 | 3/2011 | Venkataraman et al. |
| 2011/0141224 A1 | 6/2011 | Stec et al. |
| 2011/0157387 A1 | 6/2011 | Han et al. |

(56) References Cited

U.S. PATENT DOCUMENTS

| | | | |
|---|---|---|---|
| 2011/0169980 A1 | 7/2011 | Cho et al. |
| 2011/0211824 A1 | 9/2011 | Georgiev et al. |
| 2012/0183232 A1 | 7/2012 | Babacan et al. |
| 2012/0229679 A1 | 9/2012 | Georgiev et al. |
| 2012/0281072 A1 | 11/2012 | Georgiev et al. |
| 2013/0120356 A1 | 5/2013 | Georgiev |
| 2013/0120605 A1 | 5/2013 | Georgiev |
| 2013/0121615 A1 | 5/2013 | Intwala |
| 2013/0128030 A1 | 5/2013 | Georgiev |
| 2013/0128068 A1 | 5/2013 | Georgiev et al. |
| 2013/0128069 A1 | 5/2013 | Georgiev et al. |
| 2013/0128077 A1 | 5/2013 | Georgiev |
| 2013/0128081 A1 | 5/2013 | Georgiev |
| 2013/0128087 A1 | 5/2013 | Georgiev et al. |

FOREIGN PATENT DOCUMENTS

| | | |
|---|---|---|
| CN | 807604 | 7/2011 |
| EP | 1548481 | 6/2005 |
| JP | 7270791 | 10/1995 |
| JP | 2001330769 | 11/2001 |
| JP | 2004239932 | 8/2004 |
| WO | 01/37025 | 5/2001 |
| WO | 2006/057838 | 6/2006 |
| WO | WO-2007044725 | 4/2007 |
| WO | 2007/115281 | 10/2007 |
| WO | WO-2009151903 | 12/2009 |

OTHER PUBLICATIONS

Meng et al., An Approach on Hardware Design for Computational Photography Applications based on Light Field Refocusing Algorithm, Technical Reports CS-2007-15, University of Virginia, 2007.*

Aliaga et al., Plenoptic Stitching: A Scalable Method for Reconstructing 3D Interactive Walkthroughs, Proceedings of the 28th Annual Conference on Computer Graphics and Interactive Techniques, 2001, pp. 443-450.*

Chang et al., Super-Resolution Through Neighbor Embedding, Proceedings of the 2004 IEEE Computer Society Conference on Computer Vision and Pattern Recognition, 2004.*

JP504669 (1975), all pages, english equivalent is U.S. Patent 3985419, dated Oct. 12, 1976 by Matsumoto, et al.

Lumsdaine A., Georgiev T.: The focused plenoptic camera. In International Conference on Computational Photography (Apr. 2009), 8 pages.

Ng M. K., Bose N. K.: Mathematical analysis of super-resolution methodology. Signal Processing Magazine, IEEE 20, 3 (2003), pp. 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.Levoy, et al. "Recording and controlling the 4D light field in a microscope using microlens arrays", Journal of Microscopy, 2009, pp. 1-19.

Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. 436-443, 2004.

U.S. Appl. No. 12/574,183, filed Oct. 6, 2009, Adobe Systems Incorporated.

U.S. Appl. No. 12/957,326, filed Nov. 30, 2010, Adobe Systems Incorporated.

U.S. Appl. No. 12/917,984, filed Nov. 2, 2010, Adobe Systems Incorporated.

U.S. Appl. No. 12/957,308, filed Nov. 30, 2010, Adobe Systems Incorporated.

U.S. Appl. No. 11/874,611, filed Oct. 18, 2007, Adobe Systems Incorporated.

U.S. Appl. No. 12/111,735, filed Apr. 29, 2008, Adobe Systems Incorporated.

U.S. Appl. No. 12/790,677, filed May 28, 2010, Adobe Systems Incorporated.

U.S. Appl. No. 12/474,112, filed May 28, 2009, Adobe Systems Incorporated.

U.S. Appl. No. 12/130,725, filed May 30, 2008, Adobe Systems Incorporated.

U.S. Appl. No. 12/628,437, filed Dec. 1, 2009, Adobe Systems Incorporated.

U.S. Appl. No. 12/690,869, filed Jan. 20, 2010, Adobe Systems Incorporated.

U.S. Appl. No. 12/690,871, filed Jan. 20, 2010, Adobe Systems Incorporated.

U.S. Appl. No. 12/503,803, filed Jul. 15, 2009, Adobe Systems Incorporated.

S Todt, C Rezk-Salama, A Kolb, and K.-D Kuhnert, "Fast (Spherical) Light Field Rendering with Per-Pixel Depth," Technical Report, Computer Graphics Group, University of Siegen, 2007, pp. 1-8.

John Kessenich, Dave Baldwin, Randi Rost. The OpenGL Shading Language, Version: 4.00, Document Revision: 7, Feb. 12, 2010, pp. 1-160.

Mark Segal, Kurt Akeley. The OpenGL Graphics System: A Specification (Version 3.2 (Core Profile)—Dec. 7, 2009), pp. 1-104.

"PyOpenGL, The Python OpenGL® Binding" downloaded from http://pyopengl.sourceforge.net/ on Dec. 21, 2010, pp. 1-2.

T. Adelson and J. Bergen, "The plenoptic function and the elements of early vision," in Computational models of visual processing (MIT Press, 1991), pp. 1-18.

Tanida, J. Yamada, K., "TOMBO: thin observation module by bound optics," Lasers and Electro-Optics Society, 2002. LEOS 2002. The 15th Annual Meeting of the IEEE, Issue Date: 2002, pp. 233-234 vol. 1.

M Christensen, M Haney, D Rajan, S Douglas, and S Wood, "Panoptes: A thin agile multi-resolution imaging sensor," Government Microcuircuit Applications and Critical, Technology Conference (GOMACTech-05)(Jan. 2005), pp. 1-4.

D Capel and A Zisserman, "Computer vision applied to super resolution," Signal Processing Magazine(Jan. 2003), pp. 1-10.

P Sloan, M Cohen, and S Gortler, "Time critical lumigraph rendering," Proceedings of the 1997 symposium on Interactive 3D graphics (Jan. 1997), pp. 1-7.

John Nickolls, Ian Buck, Michael Garland, and Kevin Skadron, "Scalable parallel programming with cuda," Queue 6, 40-53 (2008), pp. 1-40.

John E. Stone, David Gohara, and Guochun Shi, "OpenCL—The open standard for parallel programming of heterogeneous systems." Comput. in Sci. and Eng., 12:66-73, 2010, pp. 1-66.

Georgiev, et al. "Light-Field Capture by Multiplexing in the Frequency Domain," ADOBE Technical Report, Apr. 2007, pp. 1-14.

"Optical virtual imaging at 50 nm lateral resolution with a white-light nanoscope," Zengbo Wang, Wei Guo, Lin Li, Boris Luk'yanchuk , Ashfaq Khan, Zhu Liu, Zaichun Chen, Minghui Hong, Nature Communications, Published Mar. 1, 2011, pp. 1-13.

"The optical microscopy with virtual image breaks a record: 50-nm resolution imaging is demonstrated," Zengbo Wang, Wei Guo, Lin Li, Zhu Liu, Boris Luk'yanchuk, Zaichun Chen, Minghui Hong, Jun. 2010, Cornell University Library, http://arxiv.org/abs/1006.4037v1, pp. 1-7.

"Direct imaging of photonic nanojets," Patrick Ferrand, JeromeWenger, Alexis Devilez, Martina Pianta, Brian Stout, Nicolas Bonod, Evgueni Popov, Herve Rigneault, Opt. Express 16, pp. 6930-6940 (2008).

Qiang Wu, G. D. Feke, Robert D. Grober, L. P. Ghislain, "Realization of numerical aperture 2.0 using a gallium phosphide solid immersion lens," Applied Physics Letters 75 (1999): pp. 4064-4066.

"Imaging with solid immersion lenses, spatial resolution, and applications", Q. Wu, L. P. Ghislain, and V. B. Elings, Proc. IEEE 88, 1491 (2000), pp. 1-8.

U.S. Appl. No. 13/288,765, filed Nov. 3, 2011, Georgiev.

U.S. Appl. No. 13/429,226, filed Mar. 23, 2012, Babacan, et al.

(56) References Cited

OTHER PUBLICATIONS

U.S. Appl. No. 13/288,759, filed Nov. 3, 2011, Georgiev.
U.S. Appl. No. 12/957,312, filed Nov. 30, 2010, Georgiev.
U.S. Appl. No. 12/957,316, filed Nov. 30, 2010, Georgiev.
U.S. Appl. No. 12/957,320, filed Nov. 30, 2010, Georgiev.
"European Search Report", EP Application No. 09159086.9, (Aug. 14, 2009), 8 pages.
"Final Office Action", U.S. Appl. No. 13/425,306, (Sep. 19, 2012), 7 pages.
"Final Office Action", U.S. Appl. No. 12/130,725, (Jan. 3, 2012), 6 pages.
"Non-Final Office Action", U.S. Appl. No. 12/111,735, (Jul. 28, 2011), 12 pages.
"Non-Final Office Action", U.S. Appl. No. 12/130,725, (Sep. 9, 2011), 7 pages.
"Non-Final Office Action", U.S. Appl. No. 12/186,392, (Apr. 3, 2012), 13 pages.
"Non-Final Office Action", U.S. Appl. No. 12/186,392, (Nov. 19, 2012), 13 pages.
"Non-Final Office Action", U.S. Appl. No. 12/271,389, (Sep. 30, 2010), 7 pages.
"Non-Final Office Action", U.S. Appl. No. 12/474,112, (Oct. 19, 2011), 5 pages.
"Non-Final Office Action", U.S. Appl. No. 12/628,437, (Jul. 30, 2012), 10 pages.
"Non-Final Office Action", U.S. Appl. No. 12/957,312, (Nov. 13, 2012), 14 pages.
"Non-Final Office Action", U.S. Appl. No. 12/957,320, (Dec. 5, 2012), 11 pages.
"Non-Final Office Action", U.S. Appl. No. 13/103,880, (Aug. 9, 2011), 5 pages.
"Non-Final Office Action", U.S. Appl. No. 13/425,306, (May 31, 2012), 7 pages.
"Non-Final Office Action", U.S. Appl. No. 13/476,638, (Jul. 6, 2012), 6 pages.
"Notice of Allowance", U.S. Appl. No. 12/111,735, (Dec. 14, 2011), 10 pages.
"Notice of Allowance", U.S. Appl. No. 12/130,725, (Apr. 3, 2012), 8 pages.
"Notice of Allowance", U.S. Appl. No. 12/271,389, (Feb. 2, 2011), 4 pages.
"Notice of Allowance", U.S. Appl. No. 12/271,389, (Jun. 18, 2010), 6 pages.
"Notice of Allowance", U.S. Appl. No. 12/474,112, (Jan. 30, 2012), 5 pages.
"Notice of Allowance", U.S. Appl. No. 12/503,803, (Mar. 20, 2012), 6 pages.
"Notice of Allowance", U.S. Appl. No. 12/628,437, (Dec. 18, 2012), 6 pages.
"Notice of Allowance", U.S. Appl. No. 13/103,880, (Dec. 13, 2011), 5 pages.
"Notice of Allowance", U.S. Appl. No. 13/425,306, (Dec. 10, 2012), 4 pages.
"Notice of Allowance", U.S. Appl. No. 13/429,226, (Dec. 26, 2012), 7 pages.
"Notice of Allowance", U.S. Appl. No. 13/476,638, (Oct. 29, 2012), 4 pages.
"Notice of Allowance", U.S. Appl. No. 13/549,330, (Feb. 7, 2013), 9 pages.
"Restriction Requirement", U.S. Appl. No. 12/111,735, (Apr. 29, 2011), 6 pages.
"Restriction Requirement", U.S. Appl. No. 12/130,725, (Jul. 15, 2011), 5 pages.
"Restriction Requirement", U.S. Appl. No. 12/474,112, (Jul. 28, 2011), 6 pages.
"Restriction Requirement", U.S. Appl. No. 12/957,316, (Jan. 23, 2013), 6 pages.
"Supplemental Notice of Allowance", U.S. Appl. No. 12/271,389, (Feb. 10, 2011), 2 pages.
"Supplemental Notice of Allowance", U.S. Appl. No. 12/474,112, (Mar. 8, 2012), 2 pages.
"Supplemental Notice of Allowance", U.S. Appl. No. 12/503,803, (Apr. 23, 2012), 13 pages.
"Supplemental Notice of Allowance", U.S. Appl. No. 13/103,880, (Jan. 20, 2012), 2 pages.
U.S. Appl. No. 11/627,141, filed Jan. 25, 2007, 43 pages.
U.S. Appl. No. 12/186,396, filed Aug. 5, 2008, 69 pages.
U.S. Appl. No. 12/271,389, filed Nov. 14, 2008, 63 pages.
U.S. Appl. No. 12/636,168, filed Dec. 11, 2009, 60 pages.
U.S. Appl. No. 12/690,569, filed Jan. 20, 2010, 36 pages.
U.S. Appl. No. 12/917,984, filed Nov. 2, 2010, 127 pages.
U.S. Appl. No. 12/957,322, filed Nov. 30, 2010, 53 pages.
U.S. Appl. No. 13/429,765, filed Mar. 23, 2012, 44 pages.
Aggarwal, Manoj et al., "Split Aperture Imaging for High Dynamic Range", *International Journal of Computer Vision*, (Jan. 2004), 8 pages.
Debevec, Paul E., et al., "Recovering High Dynamic Range Radiance Maps from Photographs", *ACM Transaction on Graphics, SIGGRAPH 1997 Conference Proceedings*, San Diego, CA, (1997), 10 pages.
Durand, Fredo "Fast Bilateral filtering for the Display of High-Dynamic-Range Images", *ACM Transactions on Graphics (TOG), Proceedings of the 29th Annual Conference on Computer Graphics and Interactive Techniques SIGGRAPH-02*, vol. 21, Issue 3, (2002), 10 pages.
Georgiev, U.S. Appl. No. 12/144,411, filed Jun. 23, 2008.
Guttosch, Rudolph J., "Investigation of Color Aliasing of High Spatial Frequencies and Edges for Bayer-Pattern Sensors and Foveon X3 Direct Image Sensors", *Tech. Rep., Foveon*, 2002, 8 pages.
Horstmeyer, R et al., "Flexible multimodal camera using a light field architecture.", *In Proceedings ICCP 2009*, 2009., pp. 1-8.
Horstmeyer, Roarke et al., "Modified light field architecture for reconfigurable multimode imaging", *In Adaptive Coded Aperture Imaging, Non-Imaging, and Unconventional Imaging Sensor Systems. SPIE*, 2009., 9 pages.
Horstmeyer, Roarke et al., "Pupil plane multiplexing for multi-domain imaging sensors.", *In Society of Photo-Optical Instrumentation Engineers (SPIE) Conference Series*, vol. 7096, Aug. 2008., 10 pages.
Hubel, Paul M., "Foveon Technology and the Changing Landscape of Digital Cameras", *Thirteenth Color Imaging Conference: Color Science and Engineering Systems, Technologies, and Applications*, Scottsdale, Arizona, (Nov. 2005), pp. 314-317.
Hubel, Paul M., et al., "Spatial Frequency Response of Color Image Sensors: Bayer Color Filters and Foveon X3", *Proceedings of the SPIE*, vol. 5301, (2004), pp. 1-4.
Levoy, et al., "Recording and Controlling the 4D Light Field in a Microscope Using Microlens Arrays", *Journal of Microscopy*, vol. 235, Pt 2, (Apr. 7, 2009), 19 pages.
Lippmann, "Reversible Prints", *Academie des sciences*, (Mar. 1908),3 pages.
Lyon, Richard F., et al., "Eyeing the Camera: into the Next Century", *In Proceedings IS&T/SID 10th Color Imaging Conference*, (2002), 7 pages.
Narasimhan, Srinivasa G., et al., "Enhancing resolution along multiple imaging dimensions using assorted pixels.", *IEEE Trans. Pattern Anal. Mach. Intel l.*, 27(4 ), (Apr. 2005), pp. 518-530.
Nayar, et al., "High Dynamic Range Imaging: Spatially Varying Pixel Exposures", *IEEE Conference on Computer Vision and Pattern Recognition*, Jun. 2000, vol. 1, pp. 4 72-4 79., (Jun. 2000), 8 pages.
Park, Jong H., et al., "An Ultra Wide Dynamic Range CMOS Image Sensor with a Linear Response", *Proceedings SPIE-IS&T Electronic Imaging, SPIE* vol. 6068, 2006., 8 pages.
Schechner, Yoav Y., et al., "Generalized mosaicing", *In ICCV*, pp. 17-25, 2001., 8 pages.
Schechner, Yoav Y., et al., "Generalized Mosaicing: High Dynamic Range in a Wide Field of View", *International Journal of Computer Vision*, 53(3):245-267, (2003), 23 pages.
Schechner, Yoav Y., et al., "Generalized mosaicing: Polarization panorama", *IEEE Trans. Pattern Anal. Mach. Intell.*, 27(4):631-636, 2005., pp. 631-636.

(56) References Cited

OTHER PUBLICATIONS

Schechner, Yoaz et al., "Generalized mosaicing: Wide field of view multispectral imaging", IEEE Trans. Pattern Anal. Mach. Intell., 24(1 0):1334-1348, 2002., (Oct. 2002), 1334-1348.
Tumblin, Jack et al., "LCIS: A Boundary Hierarchy for Detail-Preserving Contrast Reduction", ACM Transactions on Graphics, SIGGRAPH 1999 Conference Proceedings, Los Angeles, CA, pp. 83-90, 1999., pp. 83-90.
Adelson, T., et al. "Single Lens Stereo with a Plenoptic Camera," IEEE Transactions on Pattern Analysis and Machine, Intelligence 14, 2, Feb. 1992, pp. 99-106.
Ng, R., et al, "Light Field Photography with a Hand-Held Plenoptic Camera," Stanford Univ. Computer Science Tech, Report CSTR 2005-02, Apr. 2005, pp. 1-11.
Ng R.: "Fourier Slice Photography," Proceedings of ACM SIGGRAPH 2005 (Jan. 2005), pp. 1-10.
Lin Z., Shum H.: Fundamental limits of reconstruction-based super-resolution algorithms under local translation. IEEE Transactions on Pattern Analysis and Machine Intelligence 26, 1 (Jan. 2004), pp. 83-97.
Levoy, Mark et al., "Light Field Microscopy," Stanford University, Submitted to Siggraph 2006, pp. 1-5.
Levoy, Mark, "Optical Recipes for Light Microscopes," Stanford Computer Grpahics Laboratory Technical Memo 2006-001, Jun. 20, 2006, pp. 1-10.
Levoy M., Hanrahan P.: "Light Field Rendering," ACM Trans. Graph. (1996), pp. 31-42.
M. Levoy, "Light Fields and computational Imaging," Computer [Online], vol. 39, No. 8, Aug. 2006, pp. 46-55, XP002501300.
Georgeiv, et al. "Spatio-Angular Resolution Tradeoff in Integral Photography," Proc. EGSR, 2006, pp. 1-10.
Georgiev T., Wainer M.: "Morphing Between Multiple Images," Tech. Rep. Apr. 17, 1997, pp. 1-17.
Georgiev T., Lumsdaine A.: Depth of field in plenoptic cameras. In Eurographics 2009—Annex (Apr. 2009), pp. 5-8.
Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.
Gortler S. J., Grzeszczuk R., Szeliski, R., Cohen M. F.: "The Lumigraph," ACM Trans. Graph. (1996), pp. 43-54.
Isaksen A., McMillan L., Gortler S. J.: "Dynamically Reparameterized Light Fields," ACM Trans. Graph. (2000), pp. 297-306.
Lee S., Wolberg G., Shin S.: "Polymorph: Morphing Among Multiple Images," IEEE Computer Graphics and Applications (Jan./Feb. 1998), pp. 1-14.
Lippmann G.: "Epreuves reversible donnant la sensation du relief ("Reversible Prints Providing the Sensation of Depth")", Journal of Physics 7 (1908), pp. 821-825.
Lippmann G.: "Epreuves Reversibles Photographies Integrales," Academie des sciences (Mar. 1908), pp. 446-451.
Naemura T., Yoshida T., Harashima H.: "3d Computer Graphics Based on Integral Photography," Optics Express, vol. 8, (Feb. 6, 2001), pp. 1-8.
Seitz S. M., Dyer C. R.: "View Morphing," ACM Trans. Graph. (1996), pp. 21-30.
Stevens R., Harvey T.: "Lens Arrays for a Three-dimensional Imaging System," Journal of Optics A, vol. 4 (2002), pp. 1-5.
Stewart J., Yu J., Gortler S. J., McMillan L.: "A New Reconstruction Filter for Undersampled Light Field," Eurographics Symposium on Rendering (2003), pp. 150-156.
Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004), pp. 1-8.
Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005), pp. 1-12.

Xiao J., Shah M.: "Tri-view Morphing," Computer Vision and Image Understanding 96, 3 (2004), pp. 345-366.
Zitnick C. L., Jojic N., Kang S.: "Consistent Segmentation for Optical Flow Estimation" In Proceedings of IEEE International Conference on Computer Vision (ICCV) (2005), pp. 1-8.
Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, pp. 1-12, XP002491494.
J. Chai, S. Chan, H. Shum, and X. Tong: "Plenoptic Sampling", ACM Trans. Graph., pp. 307-318, 2000.
F. Durand, N. Holzschuch, C. Soler, E. Chan, and F. Sillion: "A frequency Analysis of Light Transport," ACM Trans. Graph., pp. 1115-1126, 2005.
Todor Georgiev and Chintan Intwala: "Light Field Camera Design for Integral View Photography," Adobe Tech. Rep., 2006, pp. 1-13.
J. Neumann, et al., "Eyes from Eyes Analysis of Camera Design Using Plenoptic Video Geometry," Dec. 2001, pp. 1-20, XP002509893.
Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, pp. 1-12.
Yang, J C, et al., "A Real-Time Distributed Light Field Camera," Rendering Techniques 2002, Eurographics Workshop Proceedings, PIS, Italy, Jun. 26-28, 2002, pp. 1-9.
Zhang, et al., "A Survey on Image-based Rendering-Representation, Sampling and Compression," Signal Processing, Image Communication, Elsevier Science Publishers, vol. 19, No. 1, Jan. 1, 2004, pp. 1-28.
Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003 pp. 1-18.
Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, pp. 1-4.
Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, pp. 1-8.
Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, pp. 1-11.
Chang, et al., "Light Field Compression Using Disparity-Compensated Lifting and Shape Adaptation," IEEE Transactions on Image Processing, vol. 15, No. 4, Apr. 2006, pp. 793-806.
Sebe, et al., "Mutli-View Geometry Estimation for Light Field Compression," VMV 2002, pp. 1-8.
Borman, S., and Stevenson, R., "Super-resolution from image sequences—a review", Proceedings of the 1998 Midwest Symposium on Circuits and Systems, Publication Date: Aug. 9-12, 1998, on pp. 374-378.
Elad, M., and Feuer, A., "Restoration of a single superresolution image from several blurred, noisy, and undersampled measured images," IEEE Transactions on Image Processing Dec. 1997, pp. 1646-1658.
Farsiu, S., Robinson, D., Elad, M., and Milanfar, P., "Advances and challenges in super-resolution," International Journal of Imaging Systems and Technology, 2004, pp. 1-12.
Park, S., Park, M., and Kang, M., "Super-resolution image reconstruction: a technical overview," Signal Processing Magazine, 2003, pp. 1-16.
David E. Roberts, History of Lenticular and Related Autostereoscopic Methods, 2003, pp. 1-17.
Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.
Lumsdaine A., Georgiev T.: Full Resolution Lightfield Rendering. Tech. rep., Adobe Systems, Jan. 2008, pp. 1-12.

(56) References Cited

OTHER PUBLICATIONS

Baker S., Kanade T.: Limits on superresolution and how to break them. IEEE Transactions on Pattern Analysis and Machine Intelligence (Jan. 2002), pp. 1-377.

Bishop T. E., Zanetti S., Favaro P.: Light field superresolution. In International Conference on Computational Photography (Apr. 16-17, 2009), pp. 1-4.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), pp. 1-10.

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, pp. 1-203.

"Final Office Action", U.S. Appl. No. 12/957,312, (Jun. 6, 2013), 16 pages.

"Final Office Action", U.S. Appl. No. 12/957,320, (Jun. 27, 2013), 16 pages.

"Non-Final Office Action", U.S. Appl. No. 12/957,316, (Mar. 22, 2013), 16 pages.

"Non-Final Office Action", U.S. Appl. No. 12/690,869, (Mar. 26, 2012), 8 pages.

"Non-Final Office Action", U.S. Appl. No. 13/434,189, (Mar. 7, 2013), 8 pages.

"Notice of Allowance", U.S. Appl. No. 12/186,392, (Mar. 13, 2013), 8 pages.

"Notice of Allowance", U.S. Appl. No. 12/690,869, (Jul. 13, 2012), 7 pages.

"Notice of Allowance", U.S. Appl. No. 13/434,189, (Jul. 10, 2013), 8 pages.

"Supplemental Notice of Allowance", U.S. Appl. No. 12/186,392, (Jul. 19, 2013), 5 pages.

Hunt, B. R., "Super-Resolution of Images: Algorithms, Principles, Performance", *International Journal of Imaging Systems and Technology*, vol. 6, (Jan. 1995), 9 pages.

"Final Office Action", U.S. Appl. No. 12/957,308, (Nov. 19, 2013), 21 pages.

"Final Office Action", U.S. Appl. No. 12/957,316, (Sep. 26, 2013), 16 pages.

"Non-Final Office Action", U.S. Appl. No. 12/957,312, (Aug. 28, 2013), 17 pages.

"Non-Final Office Action", U.S. Appl. No. 13/288,759, (Sep. 11, 2013), 11 pages.

"Notice of Allowance", U.S. Appl. No. 12/957,320, (Oct. 16, 2013), 10 pages.

"Supplemental Notice of Allowance", U.S. Appl. No. 12/186,392, (Aug. 27, 2013), 2 pages.

"Non-Final Office Action", U.S. Appl. No. 12/957,308, (Jul. 25, 2013), 18 pages.

"Final Office Action", U.S. Appl. No. 12/957,312, Dec. 13, 2013, 15 pages.

"Notice of Allowance", U.S. Appl. No. 12/957,312, Feb. 26, 2014, 12 pages.

"Notice of Allowance", U.S. Appl. No. 12/957,316, Dec. 11, 2013, 13 pages.

"Restriction Requirement", U.S. Appl. No. 12/957,326, Nov. 25, 2013, 6 pages.

"Supplemental Notice of Allowance", U.S. Appl. No. 12/957,320, Jan. 24, 2014, 2 pages.

"Supplemental Notice of Allowance", U.S. Appl. No. 12/957,320, Jan. 30, 2014, 2 pages.

"Non-Final Office Action", U.S. Appl. No. 12/957,326, Feb. 24, 2014, 8 pages.

"Non-Final Office Action", U.S. Appl. No. 13/288,759, Apr. 28, 2014, 11 pages.

"Notice of Allowance", U.S. Appl. No. 12/957,308, Mar. 28, 2014, 7 pages.

"Notice of Allowance", U.S. Appl. No. 12/957,326, May 30, 2014, 8 pages.

"Supplemental Notice of Allowance", U.S. Appl. No. 12/957,308, Jun. 9, 2014, 2 pages.

\* cited by examiner choose tilt angle (bottom left)

METHODS AND APPARATUS FOR CALIBRATING FOCUSED PLENOPTIC CAMERA DATA

PRIORITY INFORMATION

This application claims benefit of priority of U.S. Provisional Application Ser. No. 61/377,848 entitled "Methods and Apparatus for Calibrating Focused Plenoptic Camera Data" filed Aug. 27, 2010, the content of which is incorporated by reference herein in its entirety.

BACKGROUND

Description of the Related Art

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image photosensor technology, on the other hand, is only two-dimensional, and light-field imagery must therefore be captured and represented in flat (two dimensional) form. A variety of techniques have been developed to transform and capture the 4D radiance in a manner compatible with 2D photosensor technology. This may be referred to as a flat representation of the 4D radiance (or light-field), or simply as a flat.

SUMMARY

Methods, apparatus, and computer-readable storage media for calibrating focused plenoptic camera data (i.e., flats captured with an embodiment of the focused plenoptic camera) are described. Captured images may exhibit one or more of the following artifacts: 1) microimage tilt, caused by a rotation of the microlens array relative to the sensor; 2) scaling of the microimage array, caused by linear lens distortion; and 3) partially captured microimages on the edges of the sensor. Embodiments may provide calibration methods and apparatus that work for intact (un-cropped) plenoptic images, which may include capture artifacts. The calibration methods and apparatus generate a transformation matrix, and do not directly modify the raw plenoptic image data.

Embodiments may provide a user interface and methods for selecting calibration parameters, including but not limited to tilt angle, corner crops, main lens distance from the microlens array, sensor distance from the microlens array, and microimage size. In at least some embodiments, the interface may show a stationary rectangular grid, generated starting at the screen location where texture coordinates (0.0, 0.0) are originally mapped and outlining where the microimages should fall for the chosen microimage size. The calibration process may include scaling down the input texture coordinates passed to the proxy geometry for the plenoptic image, so that the new coordinate range fits the size of the texture with crops taken into account. These coordinates may be further transformed by one or more of a matrix performing a scaling, to correct for lens distortion; a rotation, to correct for tilts; and a translation that finalizes the necessary corner crops.

The selected parameters and transformations of the calibration process are not applied directly to the raw focused plenoptic camera image. Instead, a transformation matrix is generated; the original image is not transformed by the calibration process. The transformation matrix may, for example, be applied before texture look-ups in a fragment shader (e.g., implemented on a GPU or GPUs), allowing shaders to be generated that assume calibrated images, while avoiding the need for any real transformations of the input image that would result in resampling it. The ability to avoid transformations that involve resampling is important, for example, in cases where using the originally sampled data is essential to an image processing function. For example, at least some rendering algorithms for flats captured with a focused plenoptic camera depend on the fact that the image data is intact as captured with high-frequency components—e.g., that no rotation or other operations have been performed on the image data that would anti-alias or otherwise affect the data, possibly reducing or destroying high-frequency components. These rendering algorithms, include, but are not limited to, super-resolution rendering algorithms for focused plenoptic camera data.

In at least some embodiments, the calibration method may include obtaining a radiance image comprising a plurality of separate microimages of an image of a scene, and applying a calibration technique to the radiance image to generate a transformation matrix for the radiance image; the calibration technique does not modify the radiance image. In at least some embodiments, applying a calibration technique to the radiance image to generate a transformation matrix for the radiance image may include displaying the radiance image on a user interface; receiving alignment input via the user interface specifying one or more alignment parameters for microimages in the radiance image; receiving scaling input via the user interface specifying one or more scale parameters for microimages in the radiance image; receiving cropping input via the user interface specifying one or more crop parameters for microimages in the radiance image; and generating the transformation matrix according to the alignment parameters, scale parameters, and crop parameters.

In at least some embodiments, a radiance processing technique may be performed on the radiance image to render an output image. The radiance processing technique may apply the transformation matrix to the radiance image to transform the plurality of separate microimages of the microimage according to the transformation matrix and render the output image from the transformed microimages. In some embodiments, the radiance processing technique may, for example, be a super-resolution rendering technique, where the output image is a super-resolved output image of the scene. In some embodiments, at least a portion of the radiance processing technique may be performed by a fragment shader executing on one or more graphics processing units (GPUs).

In at least some embodiments, transforming the plurality of separate microimages according to the transformation matrix may include aligning one or more of the microimages according to one or more alignment parameters indicated by the transformation matrix. In at least some embodiments, transforming the plurality of separate microimages according to the transformation matrix may include scaling one or more of the microimages according to one or more scale parameters indicated by the transformation matrix. In at least some embodiments, transforming the plurality of separate microimages according to the transformation matrix may include cropping one or more of the microimages according to one or more crop parameters indicated by the transformation matrix.

Figure 1A:
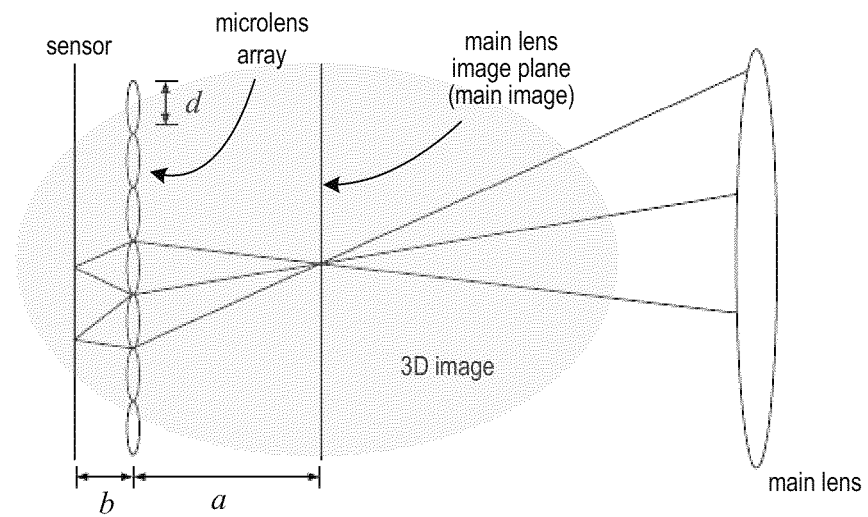
FIG 1a illustrates an example focused plenoptic camera (Keplerian telescopic case), according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Methods, apparatus, and computer-readable storage media for calibrating focused plenoptic camera data (i.e., flats captured with an embodiment of the focused plenoptic camera) are described. Raw images or flats captured using focused plenoptic camera technology consist of a plurality of microimages, with each microimage representing a separate, slightly different image of the scene captured from the main image plane of the camera, near or on which the microimages are focused. The flat is a radiance image that captures radiance or angular information as well as color or grayscale. The microimages may be appropriately processed to render output images that are combinations or blendings of multiple microimages; since the flats are radiance images, radiance processing techniques may be applied, for example refocusing at different depths from a single image captured of a scene. Note that a given pixel in a given microimage corresponds to pixels in neighboring microimages or other microimages; however, due to the design of the focused plenoptic camera, the captured image is shifted slightly in neighboring microimages.

Embodiments may provide calibration methods and apparatus that work for intact (un-cropped) plenoptic images, also referred to as flats, which may include capture artifacts. Captured flats may exhibit one or more of the following artifacts: 1) microimage tilt, caused by a rotation of the microlens array relative to the sensor; 2) scaling of the microimage array, caused by linear lens distortion; and 3) partially captured microimages on the edges of the sensor. These artifacts may need to be taken into consideration when applying radiance processing functions, such as rendering methods including super-resolution rendering methods, to flats captured with the focused plenoptic camera.

"Raw" captured image data (that is, image data as captured by a photosensor such as a CCD array) generally includes high-frequency components, e.g. frequencies above the Nyquist frequency. For displaying images, this high-frequency data, above a certain threshold, is generally removed or filtered. Many conventional image processing functions, such as rotation or other transformation functions, resample pixel values and generate new pixel values from appropriate mixtures of the original pixel values, and in so doing apply anti-aliasing to the pixel values that removes or reduces the high-frequency components above a certain threshold.

However, the originally sampled data, including the high-frequency data, is essential to some image processing functions. For example, at least some rendering algorithms for flats captured with a focused plenoptic camera depend on the fact that the image data is intact as captured with high-frequency components—e.g., that no rotation or other operations have been performed on the image data that would anti-alias or otherwise affect the data, possibly reducing or destroying high-frequency components. These rendering algorithms, include, but are not limited to, super-resolution rendering algorithms for focused plenoptic camera data. Thus, conventional image processing functions such as conventional rotation and translation functions generally cannot be directly applied to flats captured with focused plenoptic camera data to correct for the above-noted artifacts, as these conventional functions may anti-alias the data, which negatively affects radiance processing functions such as super-resolution rendering.

Thus, methods for calibrating flats captured with focused plenoptic camera technology that do not anti-alias or otherwise affect the data, possibly reducing or destroying high-frequency components, are needed. To meet this need, embodiments may provide a user interface and methods for selecting calibration parameters, including but not limited to tilt angle, corner crops, main lens distance from the microlens array, sensor distance from the microlens array, and micro-image size. In at least some embodiments, the interface may show a stationary rectangular grid, generated starting at the screen location where texture coordinates (0.0, 0.0) are originally mapped and outlining where the microimages should fall for the chosen microimage size. The calibration process may include scaling down the input texture coordinates passed to the proxy geometry for the plenoptic image, so that the new coordinate range fits the size of the texture with crops taken into account. These coordinates may be further transformed by one or more of a matrix performing a scaling, to correct for lens distortion; a rotation, to correct for tilts; and a translation that finalizes the necessary corner crops.

The selected parameters and transformations of the calibration process are not applied directly to the raw focused plenoptic camera image. Instead, a transformation matrix is generated; the original image is not transformed by the calibration process. The transformation matrix may, for example, be applied before texture look-ups in a fragment shader (e.g., implemented on a GPU or GPUs), allowing shaders to be generated that assume calibrated images, while avoiding the need for any real transformations of the input image that would result in resampling it.

This document first briefly describes focused plenoptic camera technology, and then describes embodiments of the calibration techniques for focused plenoptic camera data.

Focused Plenoptic Camera Technology

Focused plenoptic camera technology and basic rendering techniques for focused plenoptic camera data are described in U.S. patent application Ser. No. 12/474,112, entitled "Methods and Apparatus for Full-Resolution Light-Field Capture and Rendering" filed May 28, 2009, the content of which is incorporated by reference herein in its entirety.

Figure 1B:
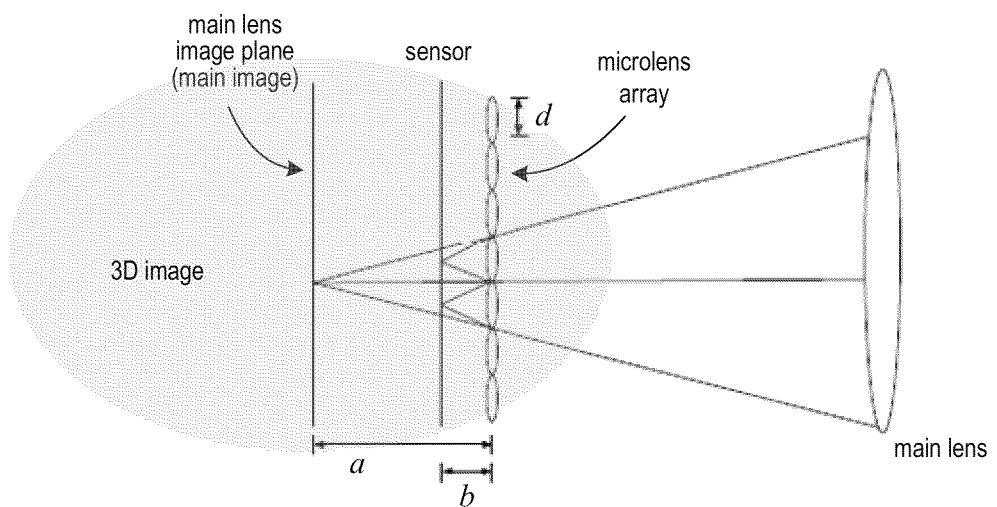
FIG. 1b illustrates an example focused plenoptic camera (Galilean telescopic case), according to some embodiments.

FIGS. 1a and 1b illustrate an example focused plenoptic camera, according to some embodiments. Note that the components shown in FIGS. 1a and 1b are not necessarily to scale relative to each other, nor are the distances between the components necessarily to scale, nor are the sizes of the components necessarily to scale. The focused plenoptic camera may include at least a main lens, a microlens array, and a photosensor. However, in the focused plenoptic camera, the array of "microcameras" is focused on an image plane of the main camera lens instead of at infinity, as in conventional plenoptic cameras. With the focused plenoptic camera, each microcamera is reimaging the main lens image onto the photosensor. The microlenses form an array of true images of the main lens image as a relay system.

The ovoid shaded area in FIGS. 1a and 1a represent the three-dimensional (3D) image formed inside the camera by the main camera lens. Note that this 3D image may extend behind the microlenses. FIG. 1a illustrates the Keplerian telescopic case where the image plane being imaged is in front of the microlenses. If the main lens forms an image behind the microlenses, it is still possible to focus the microlenses on that virtual image so that they form a real image on the photosensor. This is the Galilean telescopic case (see FIG. 1b). In both the Keplerian telescopic case and the Galilean telescopic case, the microlens imaging is described by the lens equation:

$$\frac{1}{a} + \frac{1}{b} = \frac{1}{f}$$

with, respectively, positive a (Keplerian telescopic case) or negative a (Galilean telescopic case). When remapped onto the photosensor, the image of the main lens is reduced in size. This reduction may be denoted as:

$$m = \frac{a}{b}$$

As a result of this scaling, the spatial resolution of the radiance captured by the focused plenoptic camera is a function of the resolution of the microlens images and the amount of overlap in rendering, and not of the number of microlenses. This decoupling of resolution and number of microlenses is a critical observation that distinguishes the focused plenoptic camera from the conventional plenoptic camera.

Another difference between the conventional plenoptic camera and the focused plenoptic camera is in the nature of the information that is captured by each microlens. In the conventional plenoptic camera, each microlens images one position in the scene, capturing all of the angular information there. In the focused plenoptic camera, different microlenses capture the same position; angular information is spread across microlenses. Accordingly, to render flats captured with the focused plenoptic camera, a rendering algorithm integrates across microlens images, rather than within a single microlens image. That is, assuming that the task is "imaging the image" that is in focus, the rendering algorithm integrates the points in the microlenses that correspond to the same position in the image by overlapping them at a fixed pitch. See U.S. patent application Ser. No. 12/474,112 for examples of basic rendering algorithms for flats captured with embodiments of the focused plenoptic camera.

Figure 2:
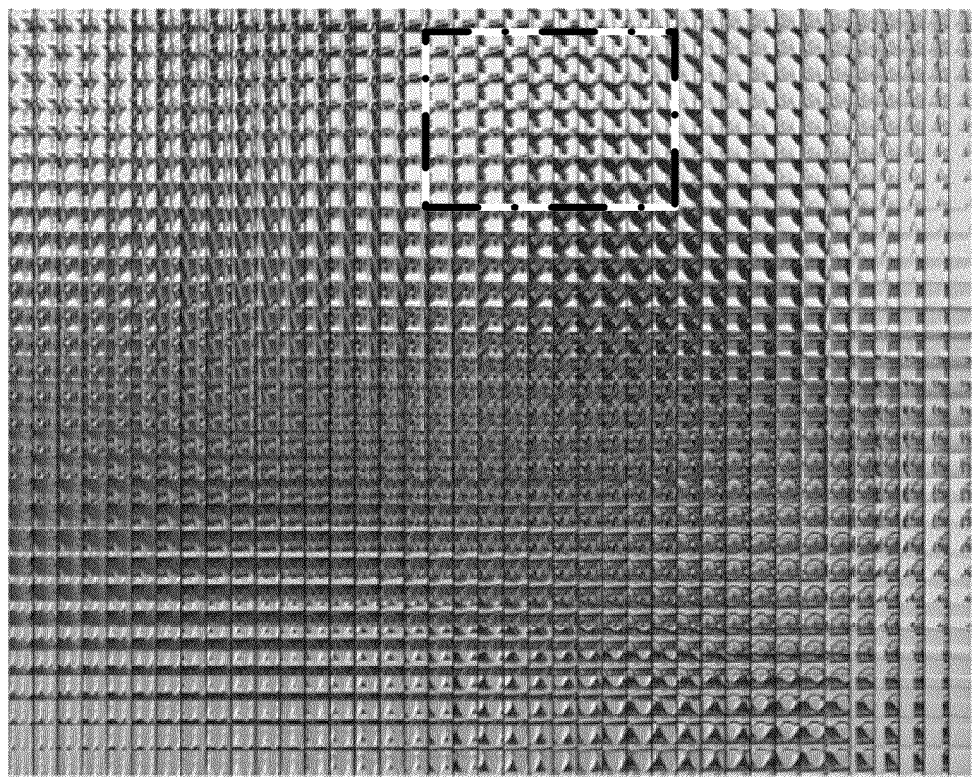
FIG. 2 shows a portion of a light-field image, or flat, captured by the example focused plenoptic camera.
Figure 3:
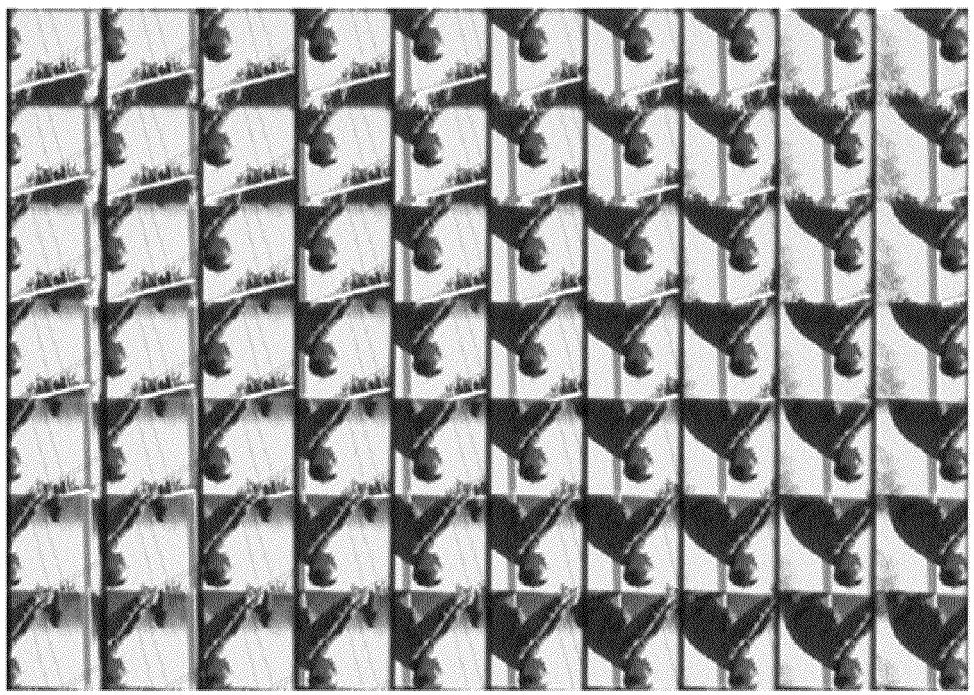
FIG. 3 is a zoom-in to the region indicated by the rectangle in FIG. 2.

FIG. 2 shows a portion of a light-field image, or flat, captured by an example focused plenoptic camera. No part of the image is in focus at the image plane; hence, the light-field image appears blurry at a macro level. However, by closely examining the microimages themselves, it can be seen that the microimages are well focused, as shown in FIG. 3, which is a zoom-in to the region indicated by the rectangle in FIG. 2. Note that a square main lens aperture was used to provide efficient use of photosensor space, so the microimages are squares and not circles. However, other geometric shapes may be used for the apertures, such as circles or rectangles.

Super-Resolution Techniques for Rendering Focused Plenoptic Camera Data

In the focused plenoptic camera, deliberate spatio-angular trade-offs may be made to obtain significant improvements in spatial resolution when compared to conventional plenoptic cameras. The focused plenoptic camera works as an array of microcameras. These microcameras are focused on the photographed object, a unique feature that distinguishes the focused plenoptic camera from conventional plenoptic cameras. Based on this feature, super-resolution techniques may be applied to the focused plenoptic camera and to the rendering of light-fields captured by the focused plenoptic camera, for example as described in U.S. patent application Ser. No. 12/690,869, entitled "Super-Resolution with the Focused Plenoptic Camera" filed Jan. 20, 2010, the content of which is incorporated by reference herein in its entirety.

Calibrating Focused Plenoptic Camera Data

Embodiments may provide a user interface for choosing calibration parameters for flats captured with focused plenoptic camera technology; the calibration parameters may include, but are not limited to, tilt angle, corner crops, main lens distance from the microlens array, sensor distance from the microlens array, and microimage size. In at least some embodiments, the interface may show a stationary rectangular grid, generated starting at the screen location where texture coordinates (0.0, 0.0) are originally mapped and outlining where the microimages of the flat should fall for the chosen microimage size. The calibration process or pipeline may include scaling down the input texture coordinates passed to the proxy geometry for the flat, so that the new coordinate range fits the size of the texture with crops taken into account. These coordinates may be further transformed by one or more of a matrix performing a scaling to correct for lens distortion, a rotation to correct for tilts, and a translation that finalizes the necessary corner crops.

This combined transformation matrix may, for example, be applied before texture look-ups in a fragment shader (e.g., implemented on a GPU or GPUs), allowing shaders to be generated that assume calibrated images, while avoiding the need for any real transformations of the input image that would result in resampling and anti-aliasing of the image data. At least some rendering algorithms for flats captured with a focused plenoptic camera depend on the fact that the image data is intact as captured with high-frequency components—e.g., that no rotation or other operations have been performed on the image data that would anti-alias or otherwise affect the data, possibly reducing or destroying high-frequency components. Examples of such rendering algorithms are various super-resolving rendering algorithms, including but not limited to the super-resolution rendering algorithms described in U.S. patent application Ser. No. 12/690,869.

Figure 4:
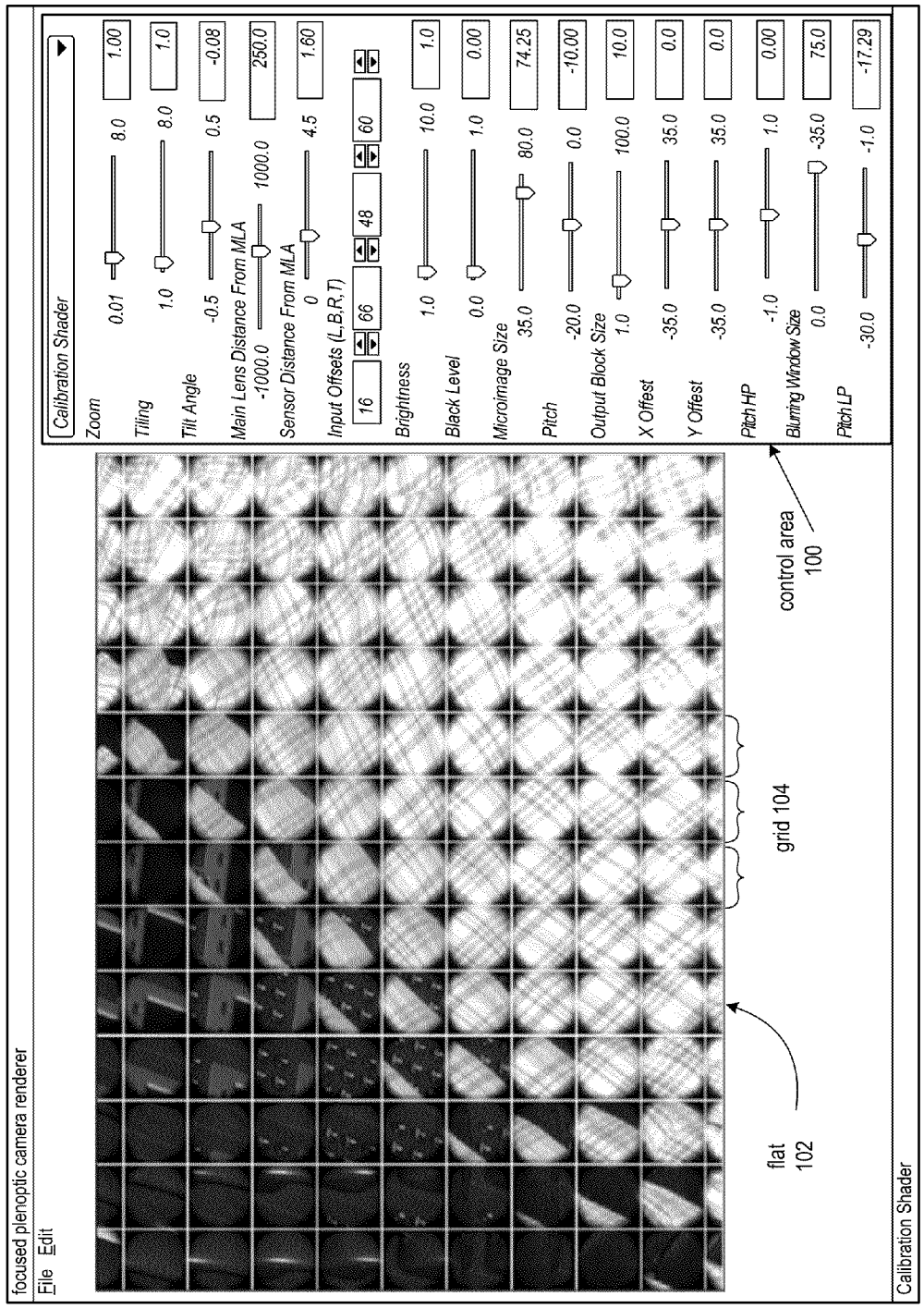
FIG. 4 shows an example calibration interface that may be provided in some embodiments.

FIG. 4 shows an example calibration interface that may be provided in some embodiments. The interface may include, but is not limited to, a control area 100 and a display of a flat 102 captured with a focused plenoptic camera. A grid 104, shown as white horizontal and vertical lines, may be projected onto the displayed flat 102, as shown.

Figure 5:
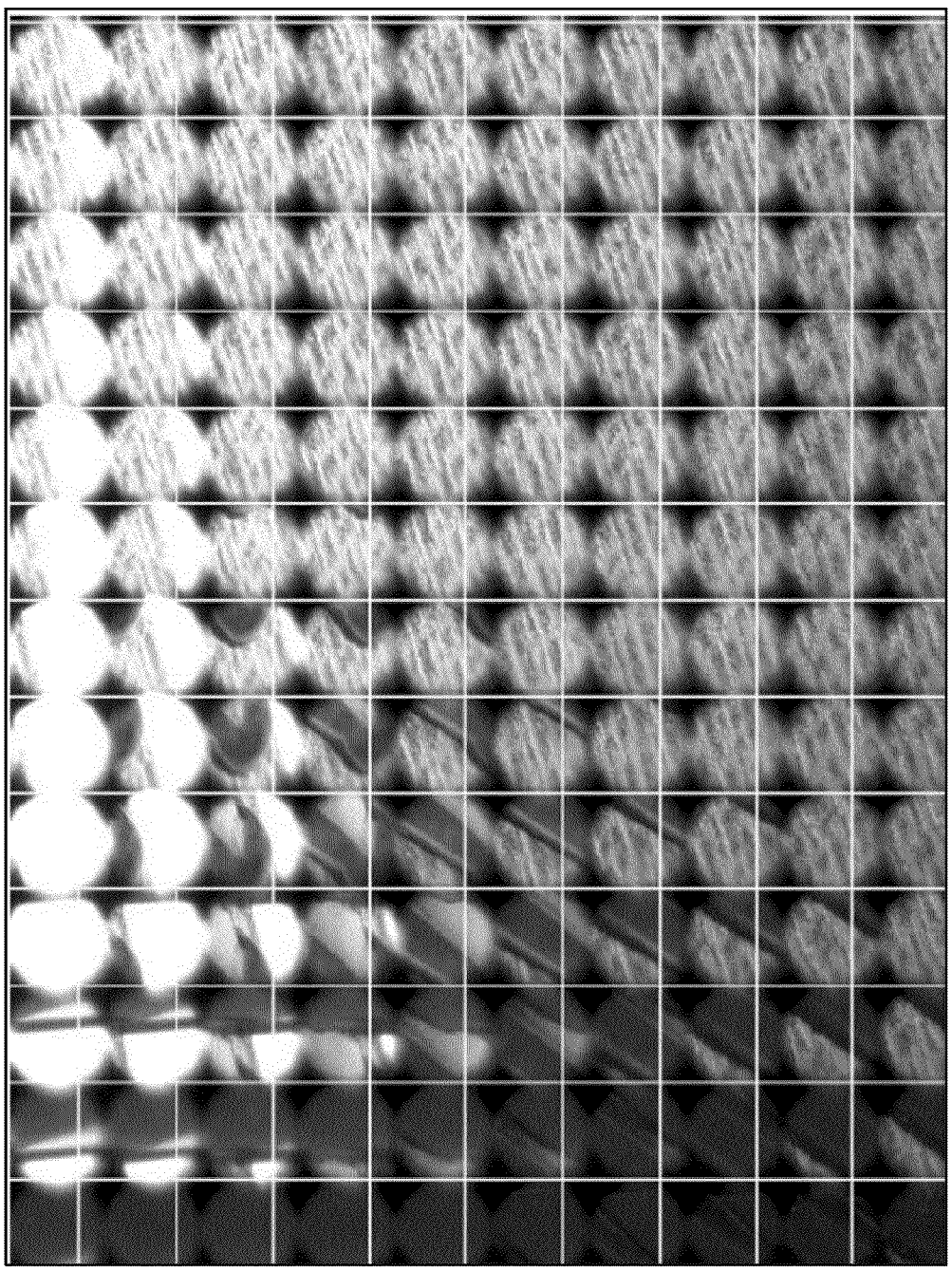
FIGS. 5 and 6 show examples of uncalibrated and calibrated input, respectively.
Figure 6:
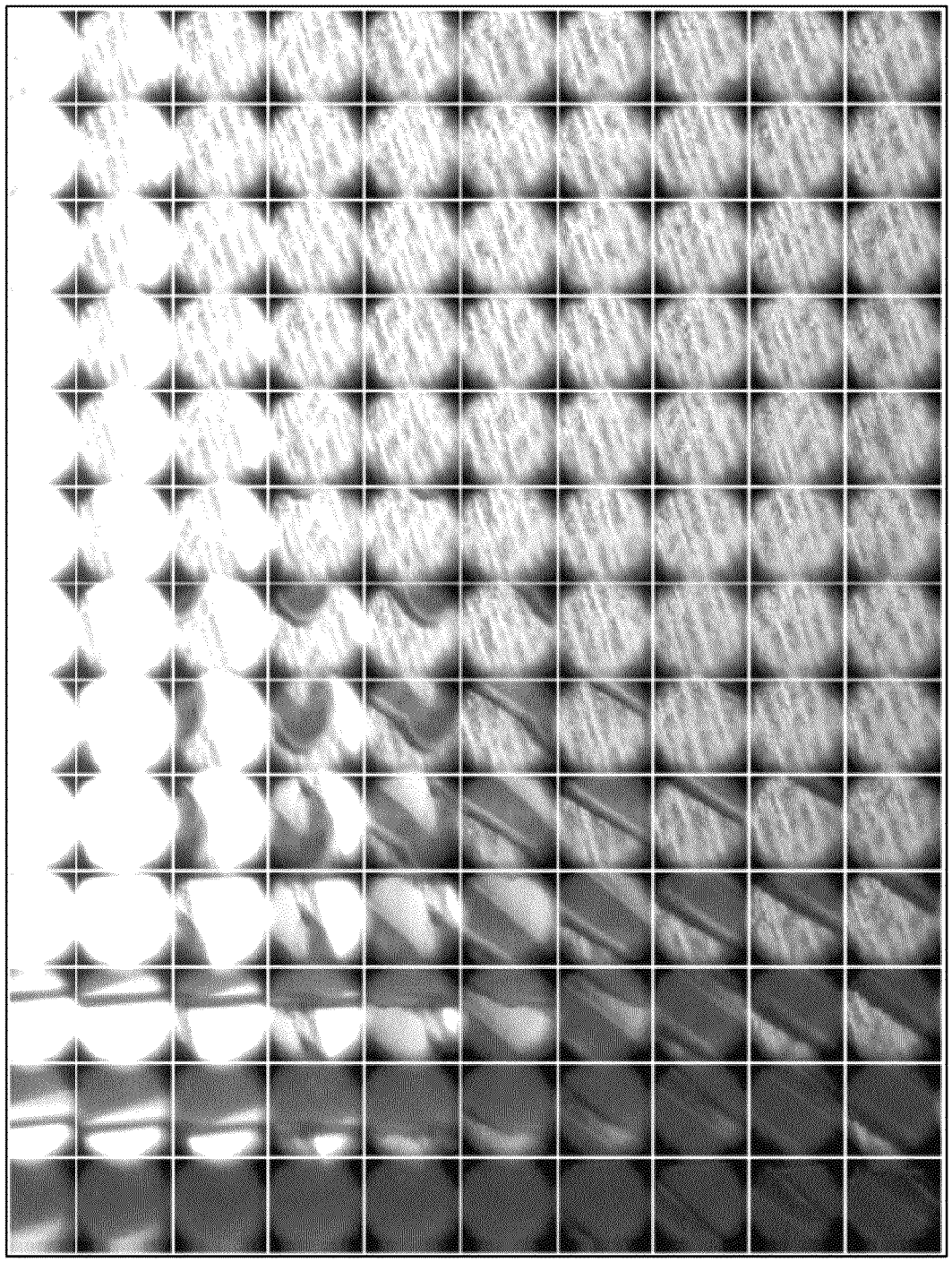

FIGS. 5 and 6 show some examples of uncalibrated and calibrated input flats, respectively. FIG. 5 shows the lower left corner of an uncalibrated plenoptic image or flat with a calibration grid displayed on top. FIG. 6 shows the same data as in FIG. 5, but calibrated according to an embodiment of the calibration technique described herein. Note that the display of the flat is modified in FIG. 6; however, the data in the original flat is not affected by the calibration process. Instead, a transformation matrix is generated that indicates an appropriate transformation to align the flat with the grid as shown. The transformation matrix may, for example specify one or more alignment parameters for microimages in the flat, one or more scale parameters for microimages in the flat, and one or more crop parameters for microimages in the flat. The one or more scale parameters may depend on the distance from the microlens array to the sensor and on the distance from the microlens array to the main lens, and may be used to determine the correct size for microimages in the flat radiance image based on the pitch between neighboring microlenses. Also note that these Figures, as well as FIGS. 7 through 9i, show circular microimages in the flats. However, in some embodiments of a focused plenoptic camera, a rectangular or square main lens aperture may be used to provide efficient use of photosensor space. See, for example, FIGS. 2 and 3, which show portions of a flat captured using a square aperture, and thus including essentially square microimages. The calibration techniques described herein may be applied to flats with circular, square, rectangular, or other shapes of microimages.

Figure 7:
FIGS. 7 and 8 show rendering results from the calibration settings used for FIGS. 5 and 6, respectively.
Figure 8:

FIGS. 7 and 8 show rendering results from the calibration settings of FIGS. 5 and 6, respectively. FIG. 7 shows an output image rendered from the input data and calibration settings of FIG. 5; in other words, no calibration is performed to properly align the input flat. Note the visible artifacts in the output image of FIG. 7 due to the rendering being performed without proper calibration. FIG. 8 shows an output image rendered from the input data and calibration settings of FIG. 6. Note that the output image of FIG. 8 is essentially artifact-free when compared to FIG. 7, as the calibration settings determined in FIG. 6 to properly align the input flat have been applied by the rendering process.

Figure 9A:
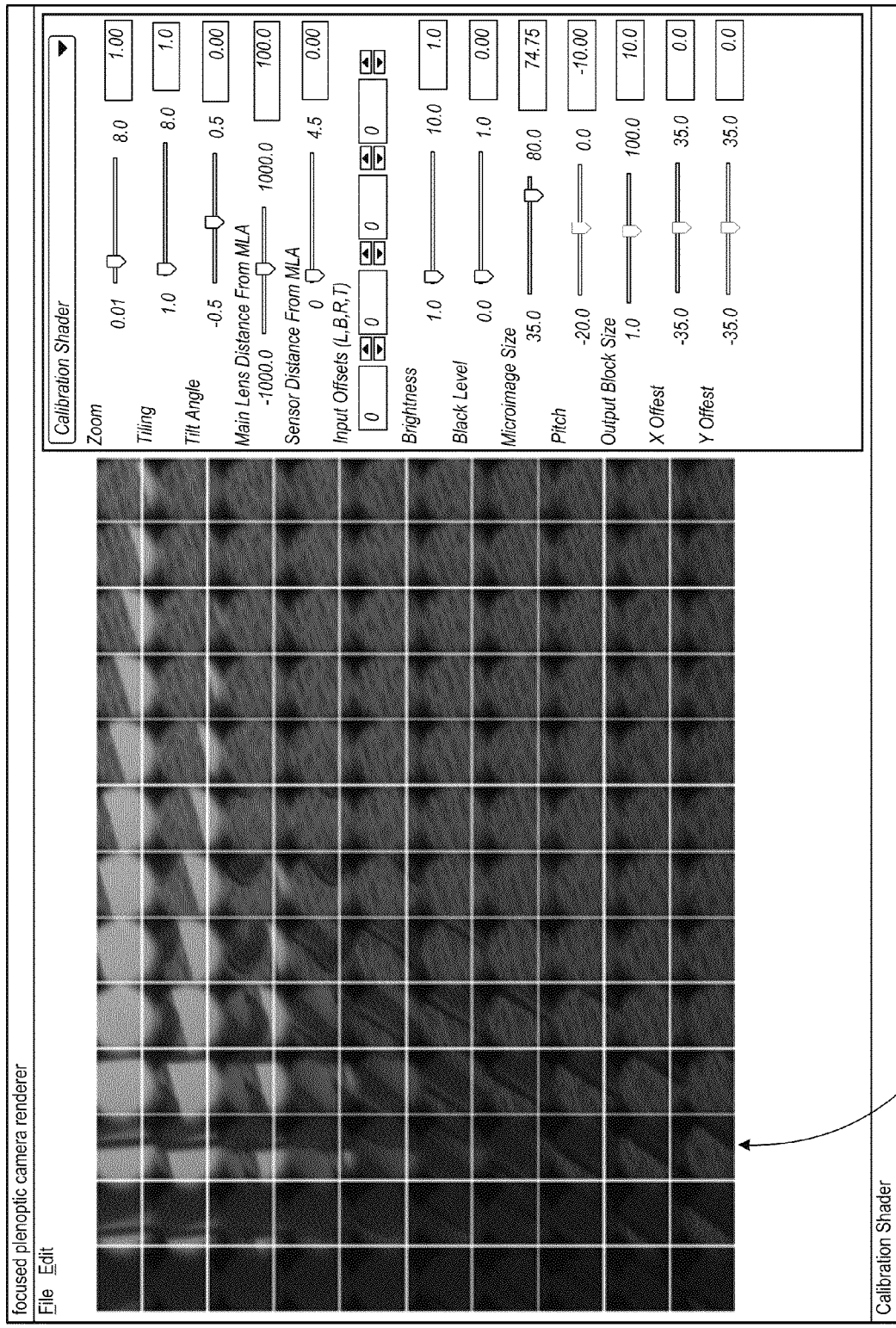
FIGS. 9a through 9i illustrate a calibration process or pipeline.
Figure 9B:
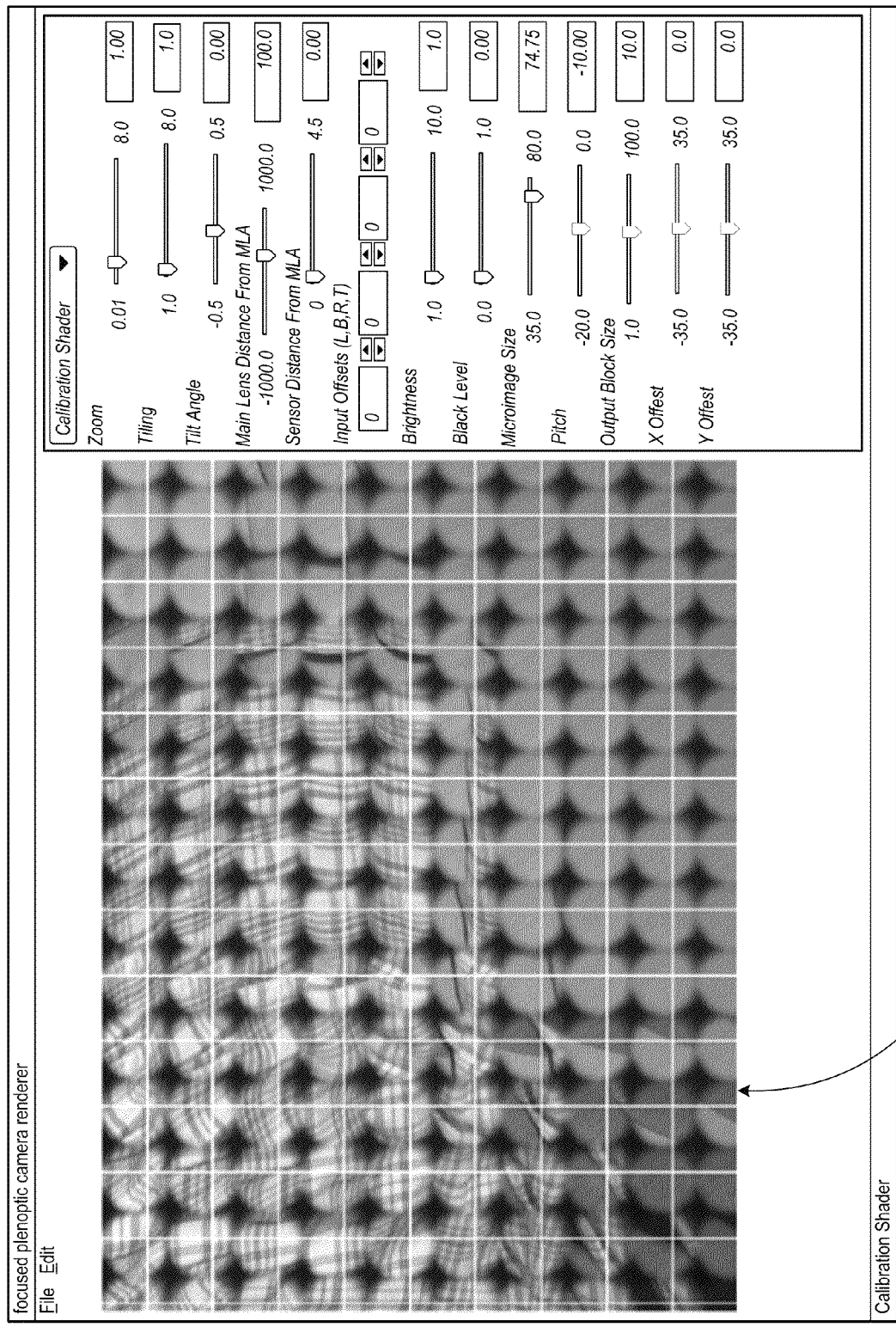
Figure 9C:
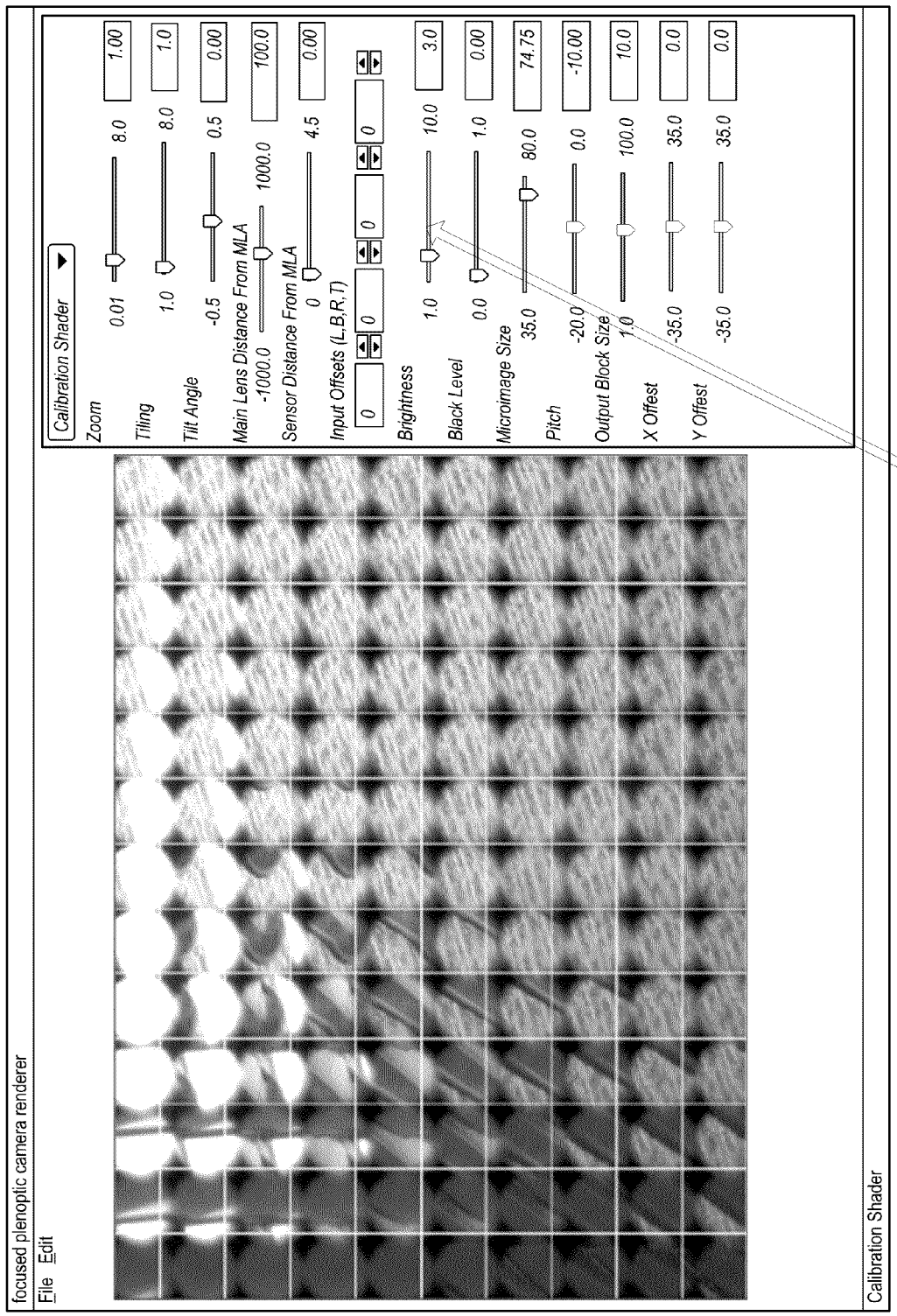
Figure 9D:
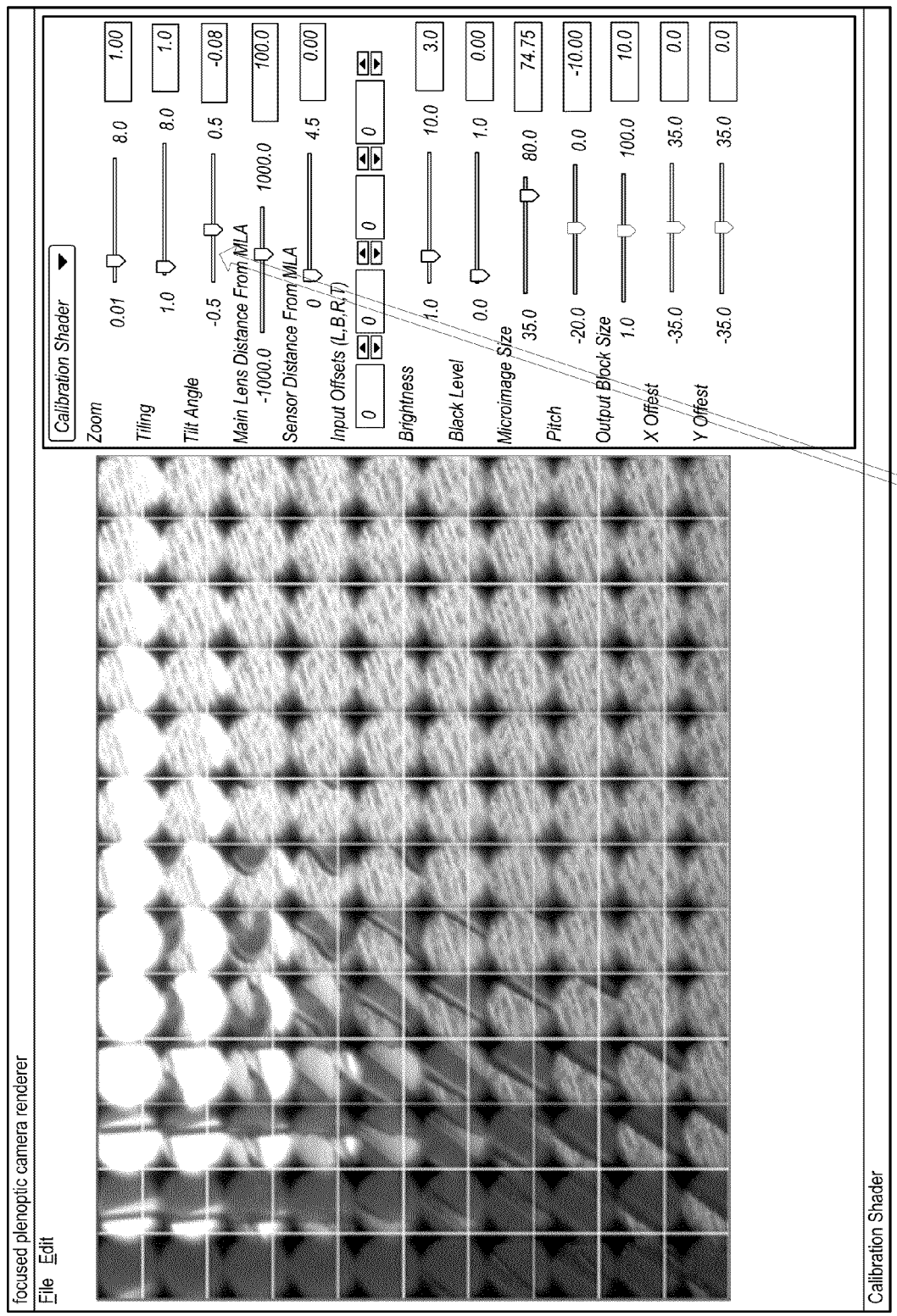
Figure 9E:
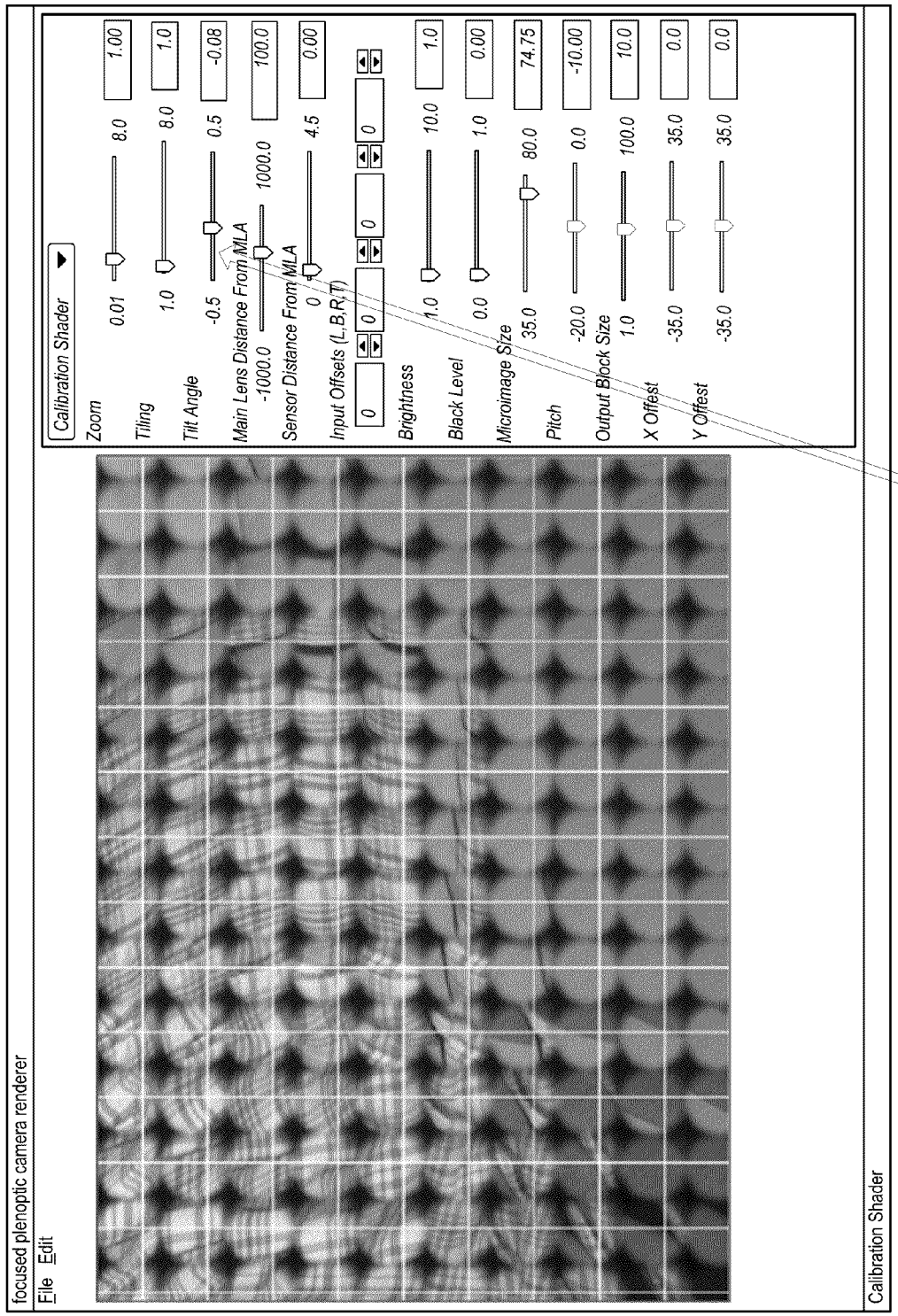

FIGS. 9a through 9i illustrate a calibration process, pipeline or workflow, according to at least some embodiments. These Figures show an example user interface and various example settings of user interface elements that may be used at each step of the calibration process, and are not intended to be limiting. FIGS. 9a and 9b show the top left and bottom right portion of an uncalibrated flat, respectively. In FIG. 9c, the user may adjust the brightness of the image, for example by adjusting a brightness slider bar, so that hard to see microimages can be made more visible. The user interface may provide immediate feedback by adjusting the brightness in the displayed portion of the flat according to the adjustment entered by the user. In FIGS. 9d and 9e, the user may choose a tilt angle at the bottom left and bottom right, respectively, for example by looking at the corners of the image (e.g., the bottom left and bottom right corners) and appropriately adjusting the tilt angle user interface element (e.g., slider bar).

Figure 9F:
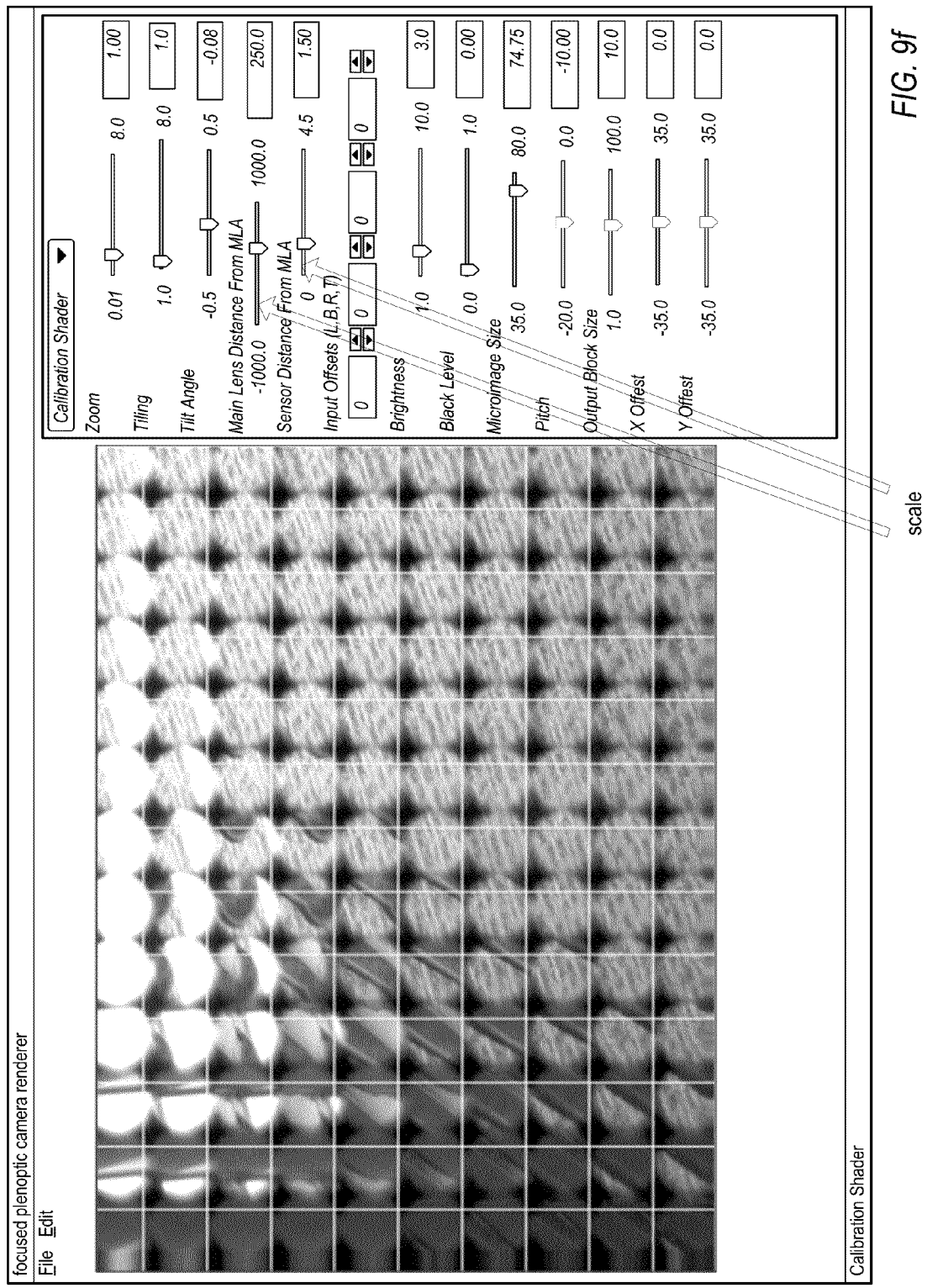
Figure 9G:
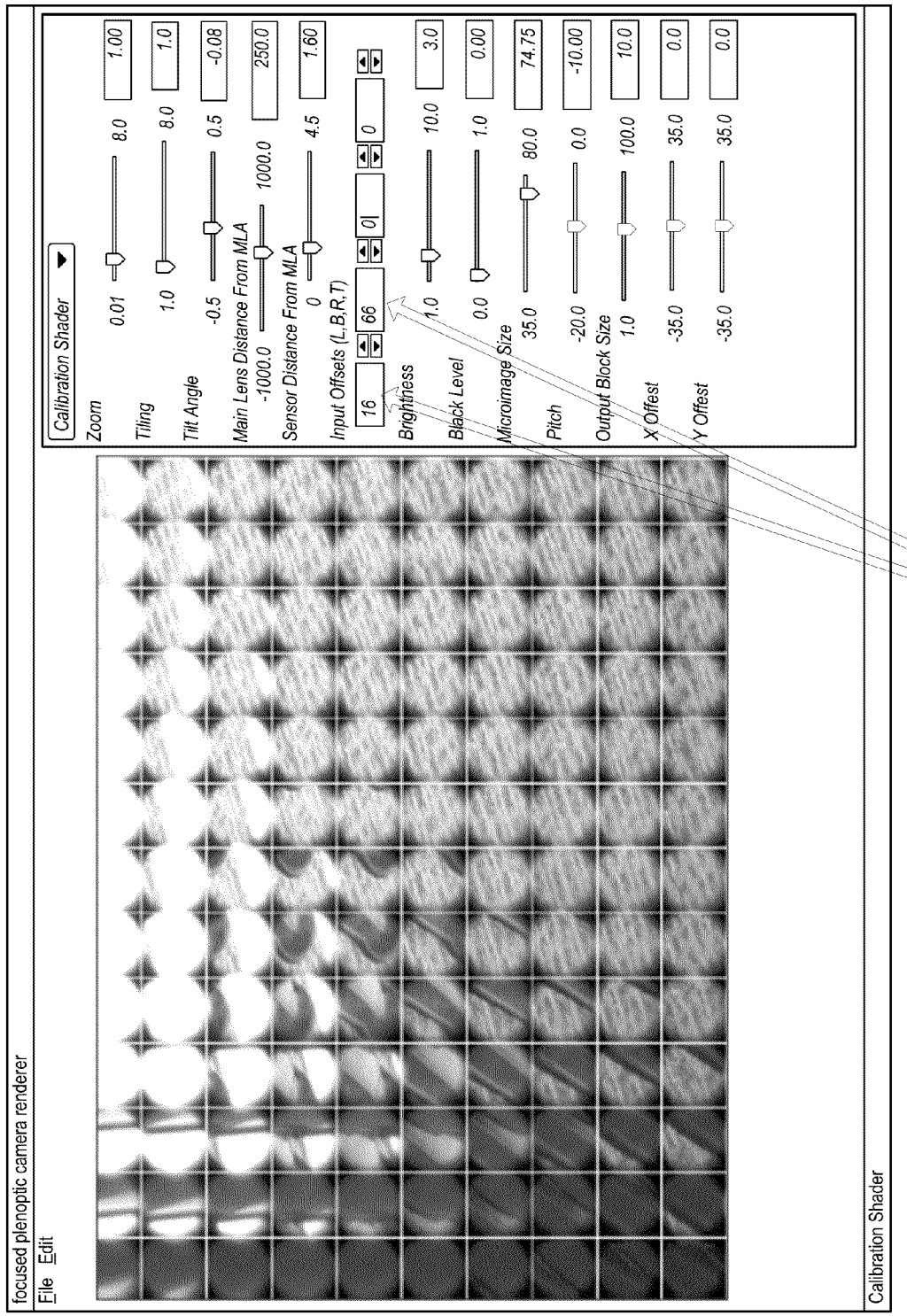
Figure 9H:
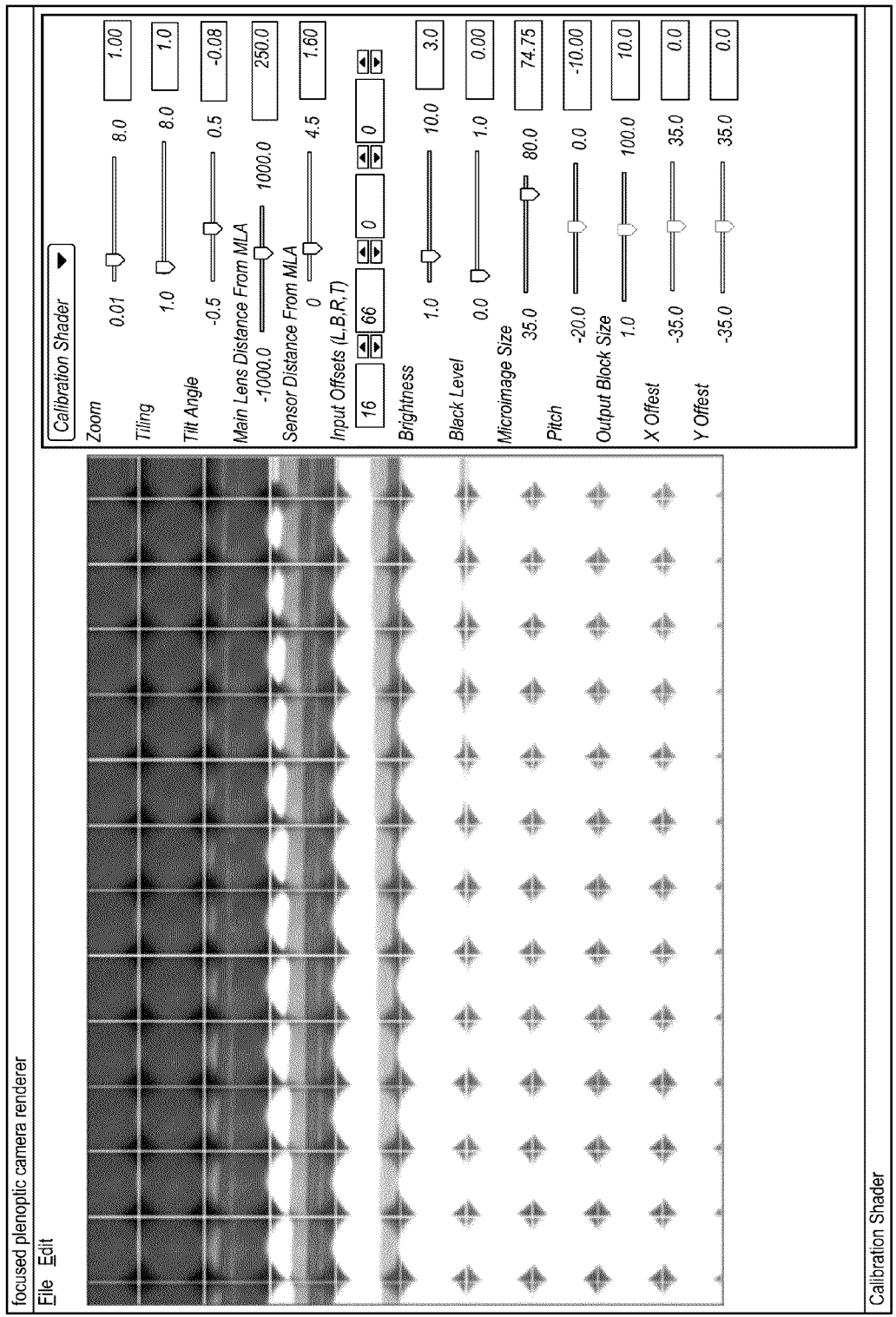
Figure 9I:
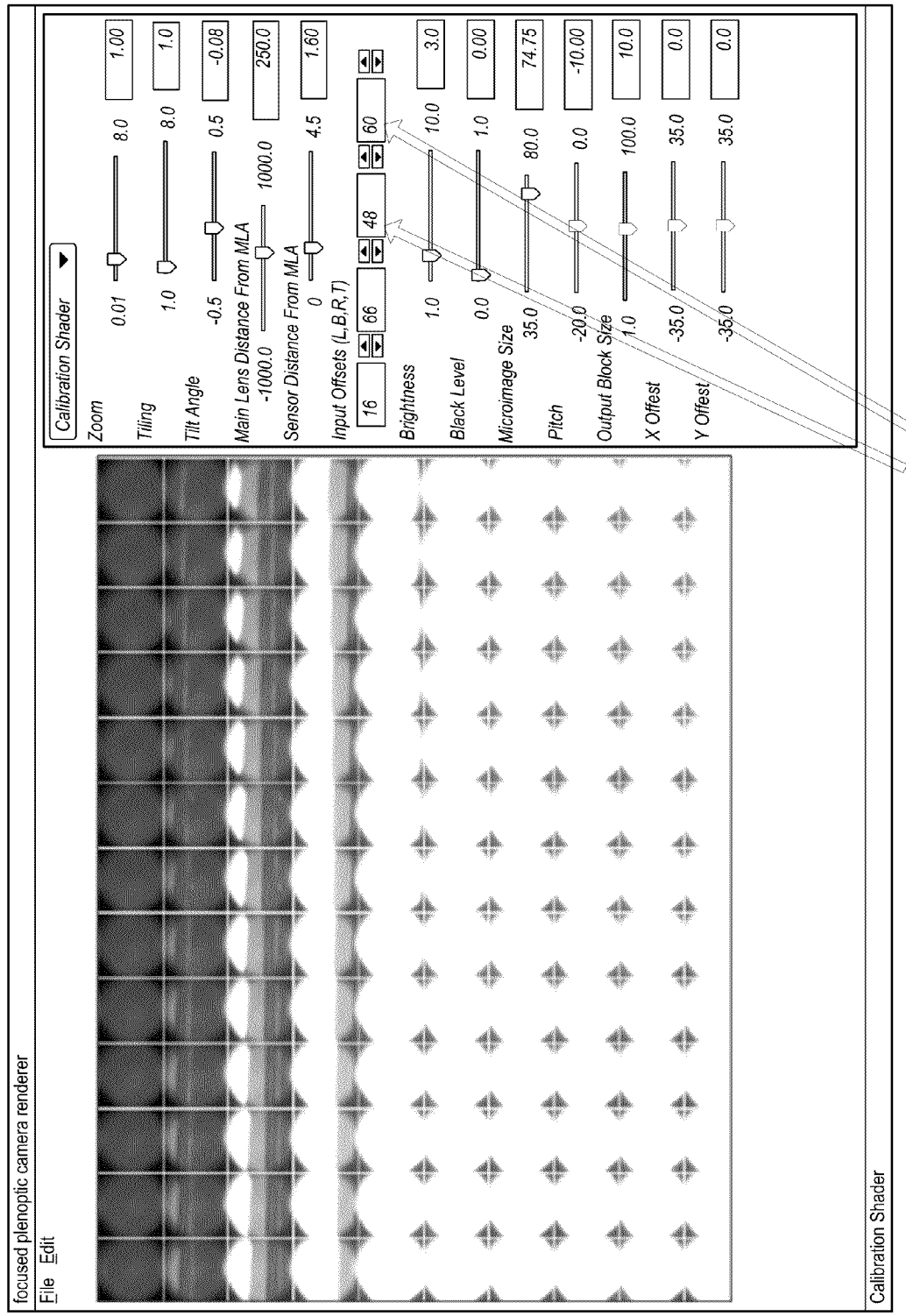

In FIGS. 9f through 9i, scaling and cropping may be performed. In some embodiments, scaling and cropping may be performed in parallel. In other embodiments, scaling may be performed separately from cropping. Note that if the center of the image is known beforehand, scaling and cropping may be performed according to the center of the image, and processing may be easier. FIG. 9f shows an image that has the correct scaling applied to it before cropping. Scaling may be applied, for example, by appropriately adjusting user interface elements corresponding to the main lens distance from the microlens array (indicated by MLA in the user interface) and to the sensor distance from the microlens array. (The distances between the main lens and the microlens array and between the microlens array and the sensor determine scaling in the focused plenoptic camera). FIG. 9g shows setting the left and bottom crops, and changes due to the cropping. FIG. 9h shows that the top right corner has been selected, and FIG. 9i shows setting the top and right crops, and changes due to the cropping.

Figure 10:
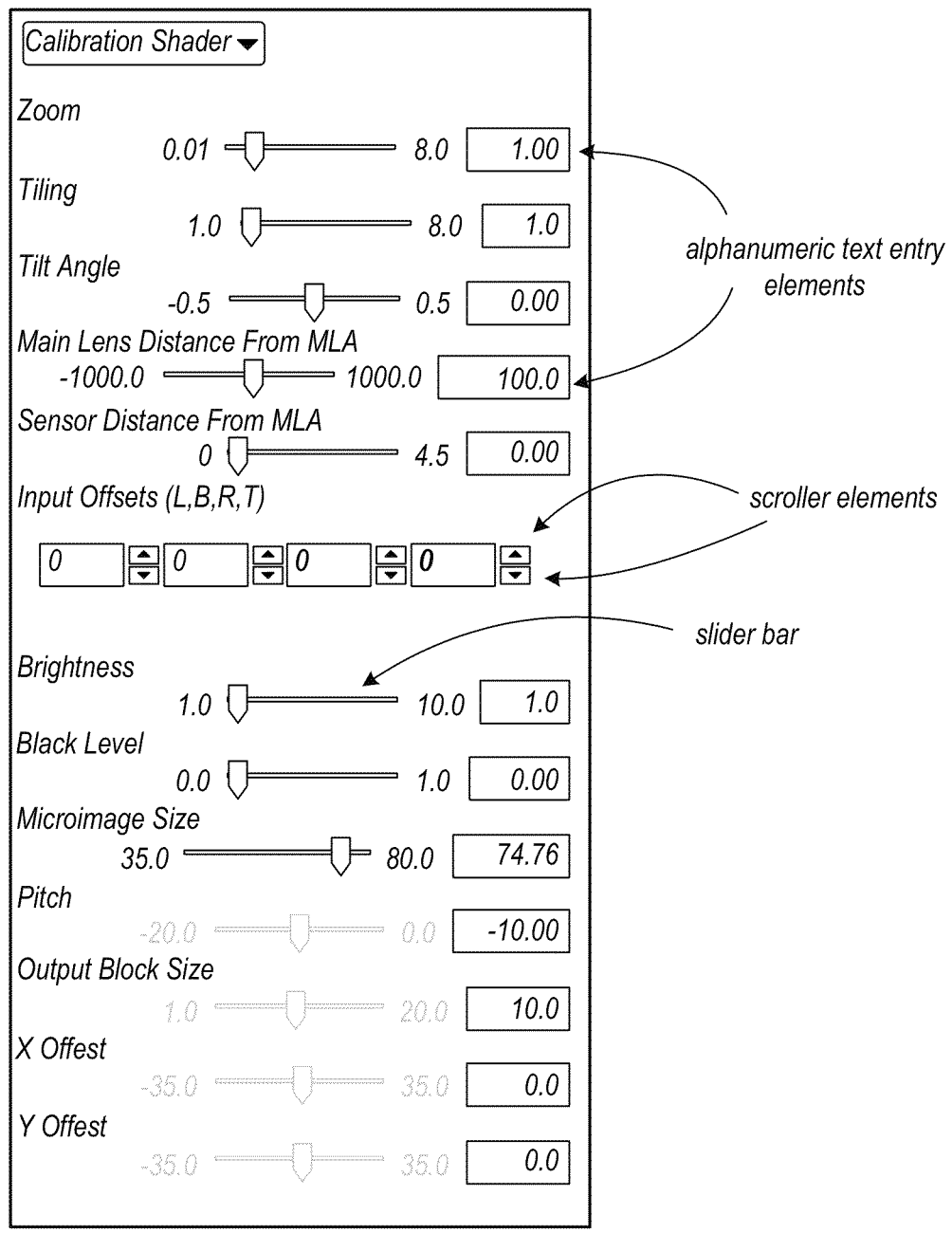
FIG. 10 shows an example control portion of the calibration user interface, according to some embodiments.

FIG. 10 shows an example control portion of a calibration user interface, according to some embodiments. Note that this example control portion is given by way of example, and is not intended to be limiting. Note that the values of the user interface elements may initially be set to default values; the user may adjust the user interface elements, for example by adjusting a slider bar, changing the value in an alphanumeric text entry element, selecting a value using scroller elements, or by other user interface elements (not shown) such as pop-up menus.

Figure 11:
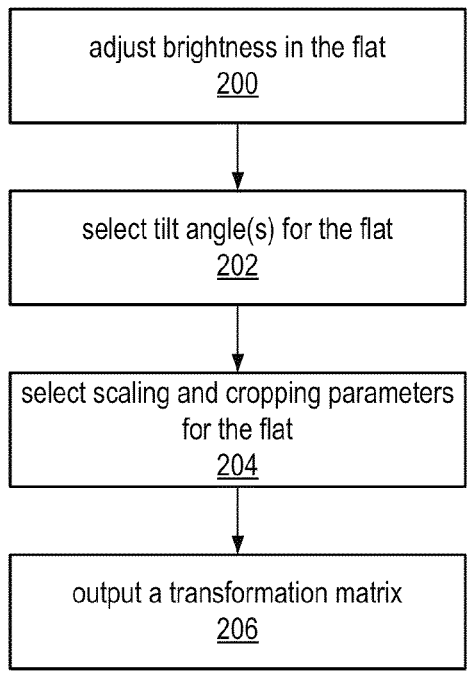
FIG. 11 is a flowchart of a calibration process, according to at least some embodiments.

FIG. 11 is a flowchart of a calibration process, according to at least some embodiments. An uncalibrated flat may be selected, for example via one or more user interface elements. As indicated at 200, the brightness of the image may be adjusted so that hard to see microimages can be made more visible. As indicated at 202, a tilt angle may be selected for the flat, for example by looking at the corners of the image (e.g., Bottom-Left and Bottom-Right). One or more other alignment parameters may also be selected. As indicated at 204, scaling and cropping parameters may be selected for the flat. In some embodiments, selecting scaling and cropping parameters may be performed in parallel. In other embodiments, selecting scaling parameters may be performed separately from selecting cropping parameters. Note that if the center of the image is known beforehand, the selection of scaling and cropping parameters may be performed according to the center of the image, and thus the processing may be easier. In some embodiments, other calibration parameters than those indicated may be adjusted by the user via the user interface. As indicated at 206, a transformation matrix for the flat may be output that indicates the calibration values as specified by the user via the calibration process of elements 200 through 204. The transformation matrix may, for example specify one or more alignment parameters for microimages in the flat (e.g., a tilt parameter), one or more scale parameters for microimages in the flat, and one or more crop parameters for microimages in the flat.

In at least some embodiments, to generate the transformation matrix, the calibration process may scale down the input texture coordinates passed to the proxy geometry for the plenoptic image, so that the new coordinate range fits the size of the texture with crops taken into account. These coordinates may be further transformed by one or more of a matrix performing a scaling to correct for lens distortion, a rotation to correct for tilts, and a translation that finalizes the necessary corner crops.

In at least some embodiments, results of the calibration process (the transformation matrix) generated for an input flat may be stored to a profile. Multiple profiles at multiple different combinations of settings for a focused plenoptic camera may be stored. In some embodiments, one or more other flats may then be processed, for example by a rendering process, by selecting an appropriate profile for the flat, so that the additional flats may not require application of the calibration process.

Figure 12:
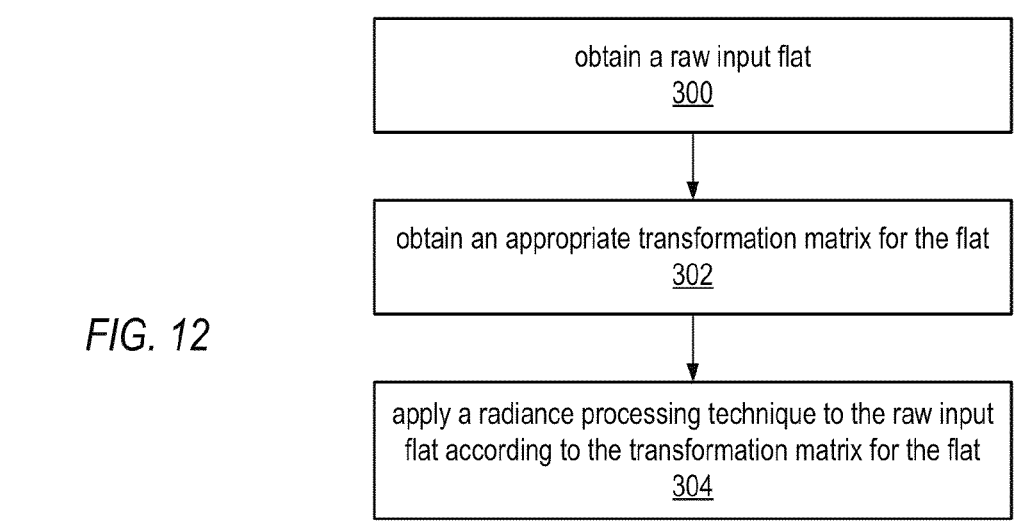
FIG. 12 illustrates an application of a transformation matrix for focused plenoptic camera flats, according to at least some embodiments.

FIG. 12 illustrates an application of a transformation matrix for focused plenoptic camera flats, according to at least some embodiments. The transformation matrix may be generated according to the calibration method of FIG. 11 and/or according to the calibration pipeline illustrated in FIGS. 9a through 9i. As indicated at 300, a radiance processing module may obtain a raw input flat to which a radiance processing technique is to be applied. The radiance processing technique may be a super-resolution rendering technique, for example as described in U.S. patent application Ser. No. 12/690,869, or some other radiance processing technique that requires raw image data. As indicated at 302, the radiance processing module may obtain a transformation matrix for the input flat. For example, the transformation matrix may be obtained from a previously stored profile corresponding to the particular camera settings used to capture the flat, or may be generated by a user via the calibration methods described above and provided to the module by the user. The transformation matrix may, for example specify one or more alignment parameters for microimages in the flat, one or more scale parameters for microimages in the flat, and one or more crop parameters for microimages in the flat. As indicated at 304, the radiance processing module may then apply a radiance processing technique, for example super-resolution rendering, to the raw input flat according to the transformation matrix for the flat to generate an output image, for example a super-resolved, high-resolution output image. As an example, a transformation matrix may be obtained and applied before texture look-ups in a fragment shader (e.g., implemented on a GPU or GPUs), allowing the shader to assume calibrated input images while avoiding the need for any real transformations of the input image that would result in resampling and possibly anti-aliasing the images. The fragment shader may be implemented as part of a super-resolution rendering technique, or some other radiance processing technique.

Implementations of Calibration Methods

Figure 13:
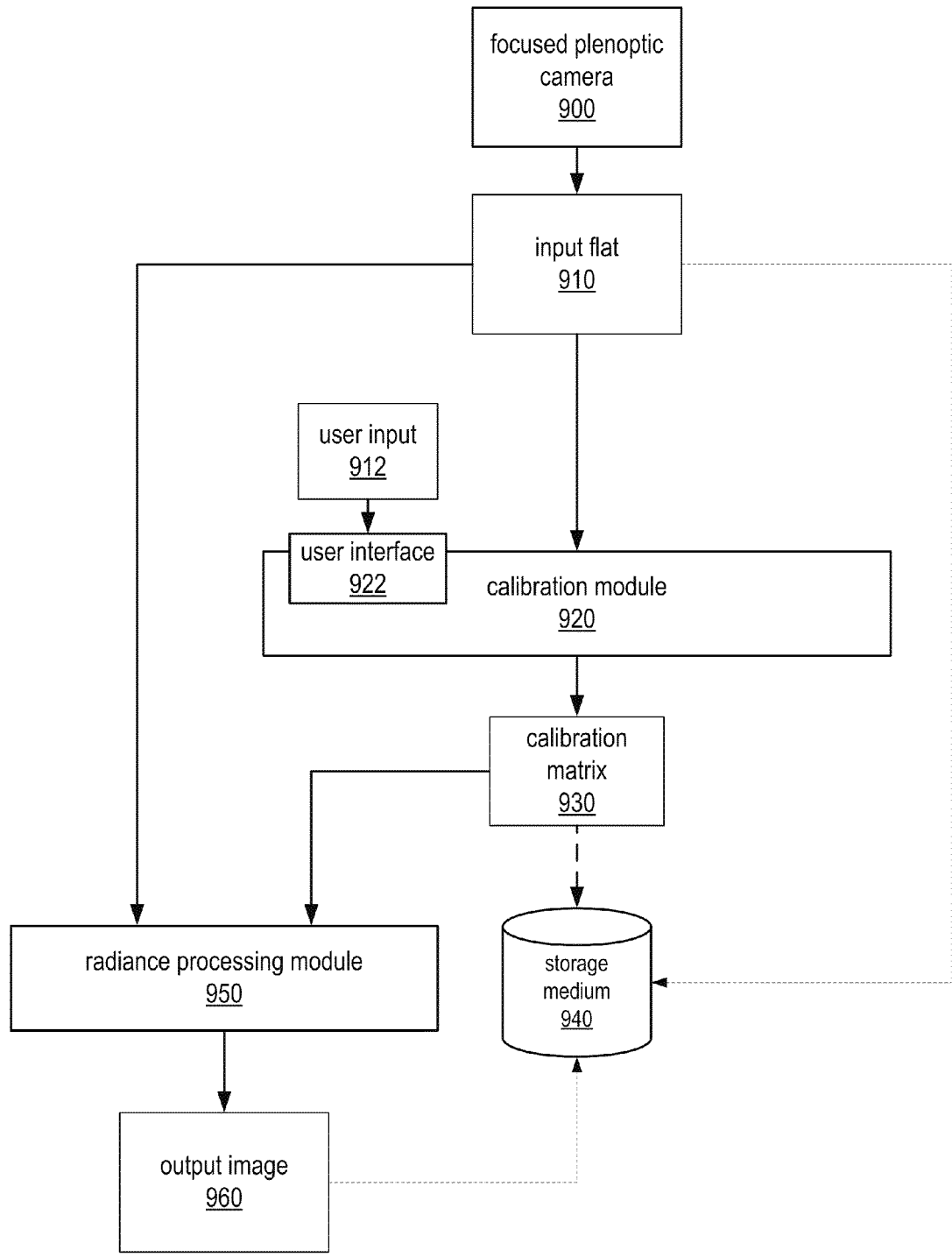
FIG. 13 illustrates a calibration module that may implement the calibration methods described herein, according to at least some embodiments.
Figure 14:
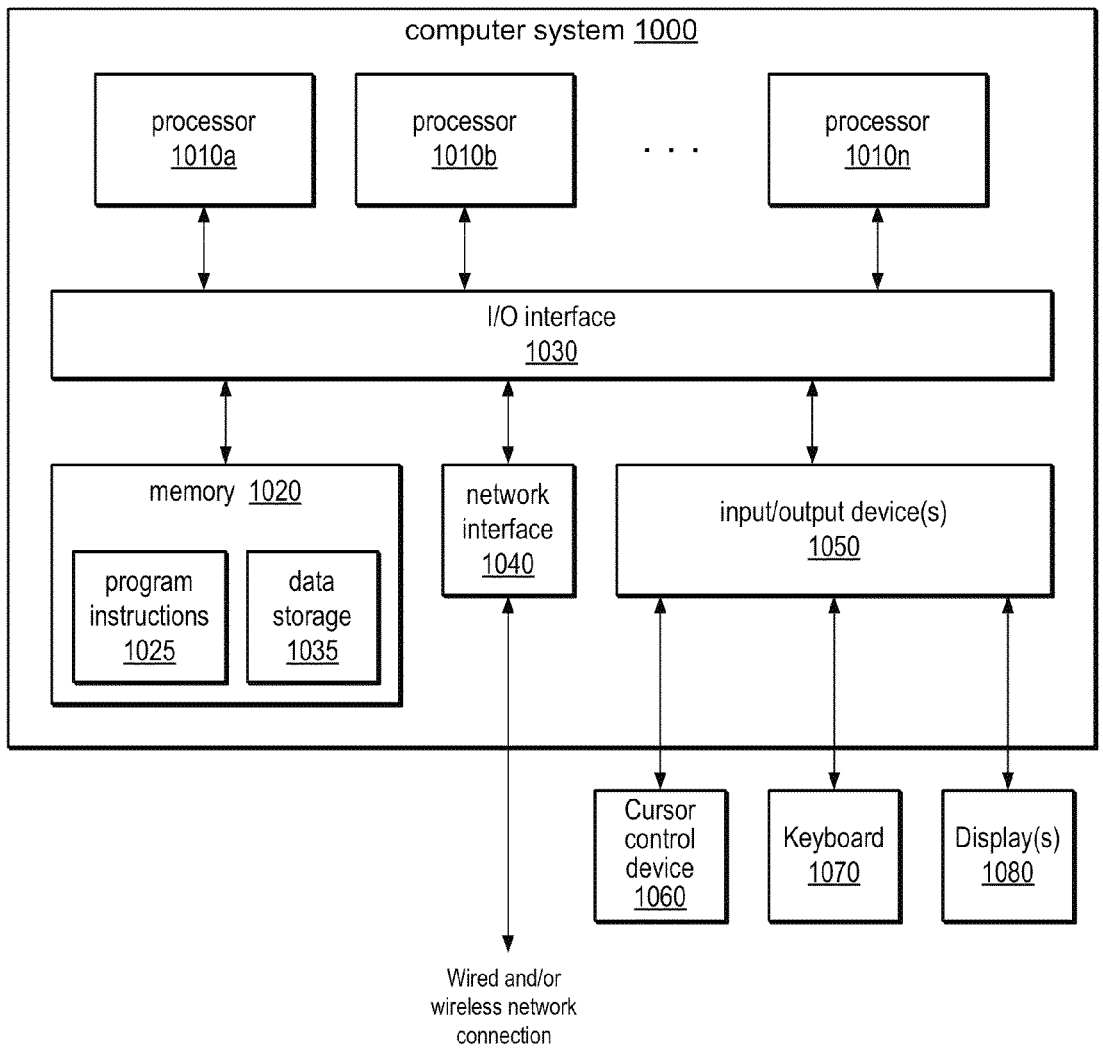
FIG. 14 illustrates an example computer system that may be used in embodiments.

Embodiments of the calibration methods described herein may be performed by a module implemented by program instructions stored in a computer-readable storage medium and executable by one or more processors (e.g., one or more CPUs or GPUs) of a computer system or other device. FIG. 13 illustrates a calibration module generating a transformation matrix for a flat captured according to focused plenoptic camera technology. Calibration module 920 may, for example, implement a calibration method as illustrated in FIG. 11. FIG. 14 illustrates an example computer system on which embodiments of calibration module 920 may be implemented. In some embodiments of a focused plenoptic camera, calibration module 920 may be implemented in the camera, e.g. in a captured data processing module. Referring to FIG. 13, calibration module 920 receives an input flat 910 captured by a focused plenoptic camera. Calibration module 920 then processes the input image 910 according to a calibration method or pipeline as described herein, for example as illustrated in FIGS. 9a through 9i and FIG. 11. However, the original input image 910 is not modified by the calibration process. Calibration module 920 instead generates as output a transformation matrix 930. Transformation matrix 930 may, for example, be stored, as a profile, to a storage medium 940, such as system memory, a disk drive, DVD, CD, etc. The dashed line from input image 910 to storage medium 940 indicates that the original (input) flat 910 may also be stored. In addition, or alternatively, transformation matrix 930 may be passed to a radiance processing module 950, for example a super-resolution rendering module, along with the original, unmodified input flat 910, for appropriate processing. See, for example FIG. 12.

In some embodiments, to generate the transformation matrix 930, the calibration module 920 may scale down the input texture coordinates passed to the proxy geometry for the plenoptic image (input flat 910) so that the new coordinate range fits the size of the texture with crops taken into account. These coordinates may be further transformed by one or more of a matrix performing a scaling to correct for lens distortion, a rotation to correct for tilts, and a translation that finalizes the necessary corner crops.

In at least some embodiments, calibration module 920 may provide a user interface 922 via which a user may interact with the calibration module 920, for example to perform a calibration process as described in FIGS. 9a through 9i and FIG. 11. Example user interfaces are shown in FIGS. 4, 9a through 9i, and 10.

Example System

Embodiments of a calibration module and/or one or more of the various calibration methods as described herein may be executed on one or more computer systems, which may interact with various other devices. One such computer system is illustrated by FIG. 14. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various rendering methods disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a calibration module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 14, memory 1020 may include program instructions 1025, configured to implement embodiments of a calibration module as described herein, and data storage 1035, comprising various data accessible by program instructions 1025. In one embodiment, program instructions 1025 may include software elements of embodiments of a calibration module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a calibration module or calibration method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   obtaining, by a computing device, a radiance image comprising a plurality of separate microimages of an image of a scene, the radiance image having a spatial resolution that is a function of a resolution of said microimages and an amount of overlap in rendering of said microimages;
   displaying first and second portions of a user interface, the first portion comprising the radiance image, the second portion comprising a control area including multiple user interface elements that are user-selectable to adjust respective parameters of the radiance image;
   applying, by the computing device, a calibration technique to the radiance image to generate a transformation matrix for the radiance image without modifying the radiance image, the calibration technique being based on an adjusted value of one or more of the multiple user interface elements; and
   performing, by the computing device, a radiance processing technique on the radiance image to render an output image, at least a portion of the radiance processing technique being performed by a fragment shades on one or more graphics processing units (GPUs), the radiance processing technique including at least:
   applying the transformation matrix to the radiance image to transform the plurality of separate microimages according to the transformation matrix before texture look-ups in the fragment shader; and
   rendering the output image from the transformed microimages.

2. The method as recited in claim 1, wherein the radiance processing technique is a super-resolution rendering technique, and wherein the output image is a super-resolved output image of the scene.

3. The method as recited in claim 1, wherein said transforming the plurality of separate microimages according to the transformation matrix comprises aligning one or more of the microimages according to one or more alignment parameters indicated by the transformation matrix.

4. The method as recited in claim 1, wherein said transforming the plurality of separate microimages according to the transformation matrix comprises scaling one or more of the microimages according to one or more scale parameters indicated by the transformation matrix.

5. The method as recited in claim 1, wherein said transforming the plurality of separate microimages according to the transformation matrix comprises cropping one or more of the microimages according to one or more crop parameters indicated by the transformation matrix.

6. The method as recited in claim 1, wherein said applying a calibration technique to the radiance image to generate a transformation matrix for the radiance image comprises:
   receiving alignment input via the user interface specifying one or more alignment parameters for microimages in the radiance image;
   receiving scaling input via the user interface specifying one or more scale parameters for microimages in the radiance image;
   receiving cropping input via the user interface specifying one or more crop parameters for microimages in the radiance image; and
   generating the transformation matrix for the radiance image according to the alignment parameters, scale parameters, and crop parameters.

7. The method as recited in claim 1, further comprising allowing the fragment shader to assume calibrated input images and avoid performing an operation on the radiance image that results in resampling or anti-aliasing the radiance image.

8. A system, comprising
   one or more processors; and
   a memory comprising program instructions, wherein the program instructions are executable by the at least one processor to:
      obtain a radiance image comprising a plurality of separate microimages of an image of a scene, the radiance image having a spatial resolution that is a function of a resolution of said microimages and an amount of overlap in rendering of said microimages, and not of a number of microlenses used to capture said microimages;
      display the radiance image in a first portion of a user interface and a control area in a second portion of the user interface, the control area including one or more user interface elements that are user-selectable to adjust respective parameters of the radiance image;
      apply a calibration technique to the radiance image to generate a transformation matrix for the radiance image without modifying the radiance image, the calibration technique being based on an adjusted value of the one or more user interface elements; and
      perform a radiance processing technique on the radiance image to render an output image, at least a portion of the radiance processing technique being performed by a fragment shader on one or more graphics processing units (GPUs), the radiance processing technique including at least:
         application of the transformation matrix to the radiance image, prior to texture lookups in the fragment shader, to transform the plurality of separate microimages according to the transformation matrix; and
         a rendering of the output image from the transformed microimages.

9. The system as recited in claim 8, wherein the radiance processing technique is a super-resolution rendering technique, and wherein the output image is a super-resolved output image of the scene.

10. The system as recited in claim 8, wherein at least one of the one or more processors is a graphics processing unit (GPU), and wherein at least a portion of the radiance processing technique is performed by program instructions executing on the at least one GPU.

11. The system as recited in claim 8, wherein, to transform the plurality of separate microimages according to the transformation matrix, the program instructions are executable by the at least one processor to align one or more of the microimages according to one or more alignment parameters indicated by the transformation matrix.

12. The system as recited in claim 8, wherein, to transform the plurality of separate microimages according to the transformation matrix, the program instructions are executable by the at least one processor to scale one or more of the microimages according to one or more scale parameters indicated by the transformation matrix.

13. The system as recited in claim 8, wherein, to transform the plurality of separate microimages according to the transformation matrix, the program instructions are executable by the at least one processor to crop one or more of the microimages according to one or more crop parameters indicated by the transformation matrix.

14. The system as recited in claim 8, wherein the system further comprises a display device, and wherein, to apply a calibration technique to the radiance image to generate a transformation matrix for the radiance image, the program instructions are executable by the at least one processor to:
   receive alignment input via the user interface specifying one or more alignment parameters for microimages in the radiance image;
   receive scaling input via the user interface specifying one or more scale parameters for microimages in the radiance image;
   receive cropping input via the user interface specifying one or more crop parameters for microimages in the radiance image; and
   generate the transformation matrix for the radiance image according to the alignment parameters, scale parameters, and crop parameters.

15. A computer-readable storage memory storing program instructions, wherein the program instructions are computer-executable to implement:
   obtaining a radiance image comprising a plurality of separate microimages of an image of a scene, the radiance image having a spatial resolution that is a function of a resolution of said microimages and an amount of overlap in rendering of said microimages;
   displaying, via a user interface having at least a first portion and a second portion, the radiance image in the first portion and a control area in the second portion, the control area including multiple user interface elements that are user-selectable to adjust respective parameters of the radiance image;
   applying a calibration technique to the radiance image to generate a transformation matrix for the radiance image without modifying the radiance image, the calibration technique being based on an adjusted value of one or more of the multiple user interface elements; and
   performing a radiance processing technique on the radiance image to render an output image, at least a portion of the radiance processing technique being performed by a fragment shader on one or more graphics processing units (GPUs), the radiance processing technique being performed by at least:
      applying the transformation matrix to the radiance image to transform the plurality of separate microimages according to the transformation matrix, the transformation matrix being applied to the radiance image before texture look-ups in the fragment shader to allow shaders to be generated that assume calibrated images; and rendering the output image from the transformed microimages.

16. The computer-readable storage memory as recited in claim 15, wherein the radiance processing technique is a super-resolution rendering technique, and wherein the output image is a super-resolved output image of the scene.

17. The computer-readable storage memory as recited in claim 15, wherein the program instructions are computer-executable to implement performing at least a portion of the radiance processing technique on one or more graphics processing units (GPUs).

18. The computer-readable storage memory as recited in claim 15, wherein, in said transforming the plurality of separate microimages according to the transformation matrix, the program instructions are computer-executable to implement aligning one or more of the microimages according to one or more alignment parameters indicated by the transformation matrix and scaling one or more of the microimages according to one or more scale parameters indicated by the transformation matrix.

19. The computer-readable storage memory as recited in claim 18, wherein, in said transforming the plurality of separate microimages according to the transformation matrix, the program instructions are computer-executable to implement cropping one or more of the microimages according to one or more crop parameters indicated by the transformation matrix.

20. The computer-readable storage memory as recited in claim 15, wherein, in said applying a calibration technique to the radiance image to generate a transformation matrix for the radiance image, the program instructions are computer-executable to implement:

receiving alignment input via the user interface specifying one or more alignment parameters for microimages in the radiance image;

receiving scaling input via the user interface specifying one or more scale parameters for microimages in the radiance image;

receiving cropping input via the user interface specifying one or more crop parameters for microimages in the radiance image; and generating the transformation matrix for the radiance image according to the alignment parameters, scale parameters, and crop parameters.

* * * * *

UNITED STATES PATENT AND TRADEMARK OFFICE
CERTIFICATE OF CORRECTION

PATENT NO. : 8,803,918 B2
APPLICATION NO. : 12/957322
DATED : August 12, 2014
INVENTOR(S) : Georgiev et al.

Page 1 of 1

It is certified that error appears in the above-identified patent and that said Letters Patent is hereby corrected as shown below:

In the Claims

Column 14, Line 48, after "...fragment", delete "shades", insert -- shader --, therefor.

Signed and Sealed this
Eleventh Day of November, 2014

Michelle K. Lee
*Deputy Director of the United States Patent and Trademark Office*